US012367606B2

(12) United States Patent
Canberk et al.

(10) Patent No.: US 12,367,606 B2
(45) Date of Patent: Jul. 22, 2025

(54) AUTOMATICALLY CROPPING OF LANDSCAPE VIDEOS

(71) Applicant: Snap Inc., Santa Monica, CA (US)

(72) Inventors: Ilteris Kaan Canberk, Marina Del Rey, CA (US); Terek Judi, Long Beach, CA (US); Phillip Larson, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 358 days.

(21) Appl. No.: 18/062,456

(22) Filed: Dec. 6, 2022

(65) Prior Publication Data

US 2023/0351627 A1    Nov. 2, 2023

Related U.S. Application Data

(60) Provisional application No. 63/335,386, filed on Apr. 27, 2022.

(51) Int. Cl.
*G06V 10/24* (2022.01)
*G06T 7/70* (2017.01)
(Continued)

(52) U.S. Cl.
CPC ............... *G06T 7/70* (2017.01); *G06V 10/24* (2022.01); *G06V 10/82* (2022.01); *G06V 40/161* (2022.01);
(Continued)

(58) Field of Classification Search
CPC ............ G06T 7/70; G06T 2207/20132; G06T 2207/30201; G06T 3/00; G06V 10/24;
(Continued)

(56) References Cited

U.S. PATENT DOCUMENTS 6,038,295 A    3/2000 Mattes
6,819,982 B2   11/2004 Doane
(Continued)

FOREIGN PATENT DOCUMENTS

CA    2887596 A1    7/2015
CN    119096298 A   12/2024
(Continued)

OTHER PUBLICATIONS

US 10,656,660 B1, 05/2020, Meisenholder et al. (withdrawn)
(Continued)

*Primary Examiner* — Henok Shiferaw
*Assistant Examiner* — Dion J Satcher
(74) *Attorney, Agent, or Firm* — Schwegman Lundberg & Woessner, P.A.

(57) ABSTRACT

Example systems, computer readable medium and methods for automatically generating portrait videos from landscape videos include receiving a landscaped video, identifying one or more objects to track, and tracking the one or more objects by moving a cropping window. A user interface is presented that provides options for a user to automatically convert a landscape video into a portrait video. The options include selecting one or more objects in the landscape video to track and tracking based on a flight plan used to capture the video. The automatic tracking uses a hierarchy of a person for tracking where a face is used if the person is close, an upper body is used if the person is farther away, and a whole body is used if the person is even farther away. A hierarchy of a person includes indications of which parts of the hierarchy to exclude first.

20 Claims, 19 Drawing Sheets

(51) Int. Cl.
*G06V 10/82* (2022.01)
*G06V 40/16* (2022.01)
*G06V 40/20* (2022.01)

(52) U.S. Cl.
CPC .... *G06V 40/20* (2022.01); *G06T 2207/20132* (2013.01); *G06T 2207/30201* (2013.01); *G06V 2201/07* (2022.01)

(58) Field of Classification Search
CPC ...... G06V 10/82; G06V 40/161; G06V 40/20; G06V 2201/07; G06V 40/10; G06V 10/25
See application file for complete search history.

(56) References Cited

U.S. PATENT DOCUMENTS

| | | |
|---|---|---|
| 6,980,909 B2 | 12/2005 | Root et al. |
| 7,173,651 B1 | 2/2007 | Knowles |
| 7,411,493 B2 | 8/2008 | Smith |
| 7,535,890 B2 | 5/2009 | Rojas |
| 7,542,073 B2 | 6/2009 | Li et al. |
| 7,971,156 B2 | 6/2011 | Albertson et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,225,897 B1 | 12/2015 | Sehn et al. |
| 9,276,886 B1 | 3/2016 | Samaranayake |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,705,831 B2 | 7/2017 | Spiegel |
| 9,723,272 B2 | 8/2017 | Lu et al. |
| 9,742,713 B2 | 8/2017 | Spiegel et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,102,423 B2 | 10/2018 | Shaburov et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,284,508 B1 | 5/2019 | Allen et al. |
| 10,370,118 B1 | 8/2019 | Nielsen et al. |
| 10,439,972 B1 | 10/2019 | Spiegel et al. |
| 10,501,180 B2 | 12/2019 | Yu |
| 10,509,466 B1 | 12/2019 | Miller et al. |
| 10,514,876 B2 | 12/2019 | Sehn |
| 10,614,855 B2 | 4/2020 | Huang |
| 10,748,347 B2 | 8/2020 | Li et al. |
| 10,768,639 B1 | 9/2020 | Meisenholder et al. |
| 10,928,904 B1* | 2/2021 | Novelli ............... G06F 3/013 |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,081,141 B2 | 8/2021 | Li et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,226,731 B1 | 1/2022 | Burfitt et al. |
| 11,227,626 B1 | 1/2022 | Krishnan Gorumkonda et al. |
| 2007/0250526 A1 | 10/2007 | Hanna |
| 2008/0181512 A1 | 7/2008 | Gavin et al. |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2014/0254896 A1 | 9/2014 | Zhou et al. |
| 2015/0022432 A1 | 1/2015 | Stewart et al. |
| 2015/0070272 A1 | 3/2015 | Kim et al. |
| 2015/0109408 A1* | 4/2015 | Sharma ............... H04N 23/69 348/39 |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 | 2/2017 | Liu et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0225796 A1 | 8/2017 | Sun et al. |
| 2017/0228690 A1 | 8/2017 | Kohli |
| 2017/0244937 A1 | 8/2017 | Meier et al. |
| 2017/0320564 A1 | 11/2017 | Kuzikov |
| 2017/0337791 A1 | 11/2017 | Gordon-carroll |
| 2017/0371353 A1 | 12/2017 | Millinger, III |
| 2018/0082682 A1 | 3/2018 | Erickson et al. |
| 2018/0246529 A1 | 8/2018 | Hu et al. |
| 2018/0352191 A1 | 12/2018 | Eppolito et al. |
| 2019/0011921 A1 | 1/2019 | Wang et al. |
| 2019/0266980 A1* | 8/2019 | Kast ............... G09G 5/363 |
| 2020/0241575 A1 | 7/2020 | Meisenholder et al. |
| 2020/0327347 A1* | 10/2020 | Arai ............... H04N 7/181 |
| 2020/0366973 A1 | 11/2020 | Pachauri et al. |
| 2021/0011612 A1 | 1/2021 | Dancie et al. |
| 2021/0012501 A1* | 1/2021 | Saito ............... G06F 3/04842 |
| 2021/0012502 A1* | 1/2021 | Mulford ............... G06V 20/05 |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0352206 A1* | 11/2021 | Chan ............... G06V 40/166 |
| 2021/0362848 A1 | 11/2021 | Spencer |
| 2021/0382503 A1 | 12/2021 | Meisenholder et al. |
| 2021/0382564 A1 | 12/2021 | Blachly et al. |
| 2021/0397000 A1 | 12/2021 | Rodriguez, II |

(56) References Cited

U.S. PATENT DOCUMENTS

FOREIGN PATENT DOCUMENTS

| JP | 2021105808 | A | * | 7/2021 | |
|---|---|---|---|---|---|
| WO | WO-2021206014 | A1 | * | 10/2021 | ............... G07C 9/10 |
| WO | 2023211617 | | | 11/2023 | |

OTHER PUBLICATIONS

"International Application Serial No. PCT/US2023/016761, International Search Report mailed Jun. 19, 2023", 4 pgs.
"International Application Serial No. PCT/US2023/016761, Written Opinion mailed Jun. 19, 2023", 6 pgs.
Laput, Gierad, et al., "PixelTone: A Multimodal Interface for Image Editing", ACM, Proceedings of the SIGCHI Conference on Human Factors in Computing Systems, Paris, FR, (2013), 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Meisenholder, David, et al., "Remoteless Control of Drone Behavior", U.S. Appl. No. 15/640,143, filed Jun. 30, 2017, 108 pgs.
Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.
Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.
"International Application Serial No. PCT/US2023/016761, International Preliminary Report on Patentability mailed Nov. 7, 2024", 8 pgs.

* cited by examiner

AUTOMATICALLY CROPPING OF LANDSCAPE VIDEOS

CLAIM OF PRIORITY

This application claims the benefit of priority to U.S. Provisional Application Ser. No. 63/335,386, filed on Apr. 27, 2022, which is incorporated herein by reference in its entirety.

TECHNICAL FIELD

Examples of the present disclosure relate generally to automatically generating portrait videos from landscape videos. More particularly, but not by way of limitation, the present disclosure addresses systems and methods for generating portrait videos from landscape videos by tracking one or more objects in the landscape videos and moving a cropping window based on movement of the one or more objects.

BACKGROUND

Users often want to edit and modify videos to enhance their presentation. But editing programs are often limited in the options provided and users are often limited in the amount of time they have to edit the videos.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Example systems, computer readable medium and methods include receiving a landscape video 822 and generating a portrait video 826 from the landscape video. Often users prefer portrait videos 826 because they are easier to view on a smartphone 608. However, generating a portrait video 826 from a landscape video 822 may cutoff or exclude portions of the landscape video 822 that the user would like to include in the portrait video 826. Moreover, it is time consuming and tedious for a user to manually convert a landscape video to a portrait video 826.

Figure 8:
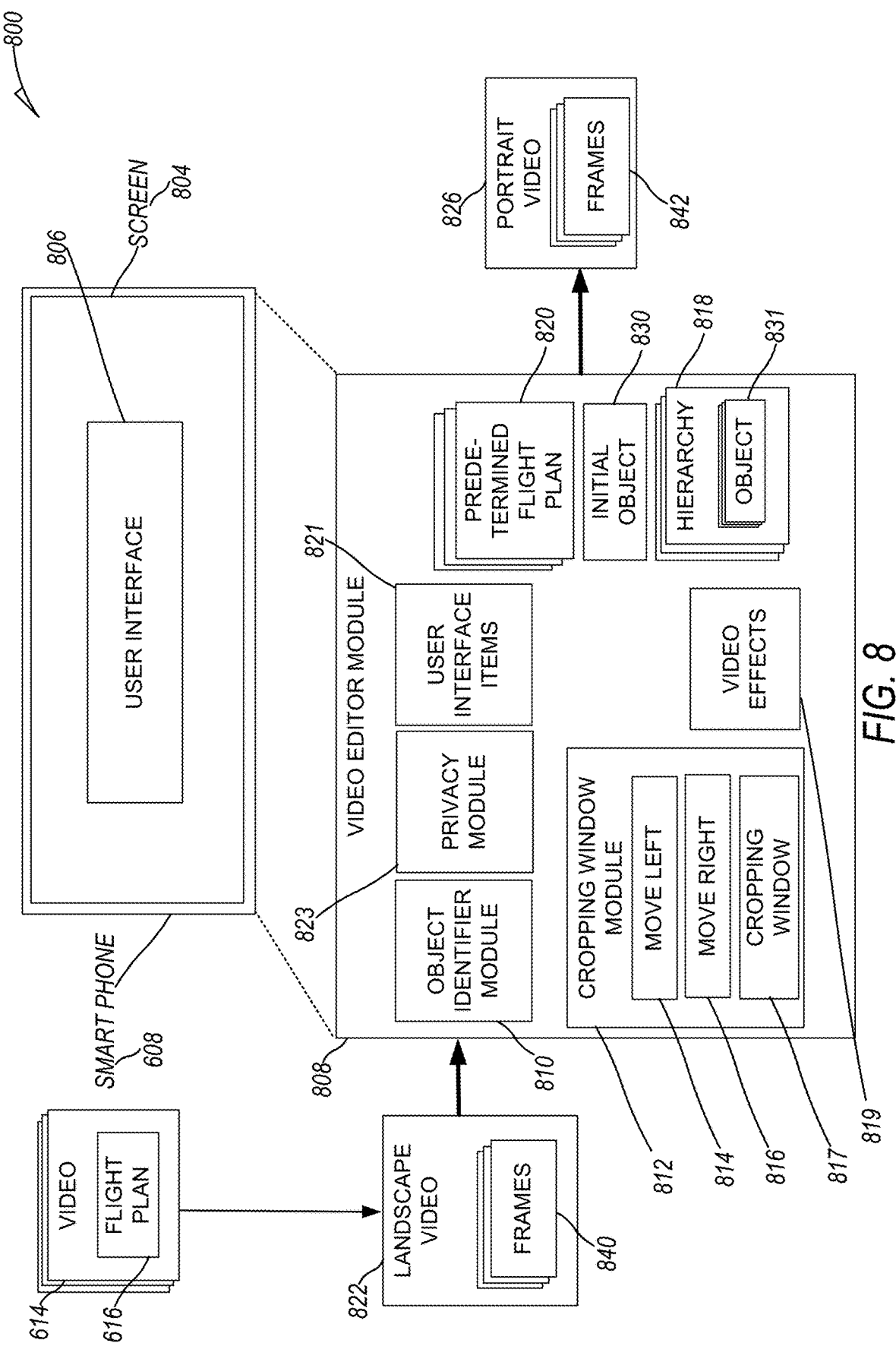
FIG. 8 illustrates a system for automatically cropping of landscape videos, in accordance with some examples.

On challenge, referring to FIG. 8, is how to choose which portions of the landscape video 822 to include in the portrait video 826. In some examples, the challenge is addressed by the cropping window module 812 using a cropping window 817 to select the portion of a frame of the landscape video 822 to include in the portrait video 826. For example, the cropping window module 812 includes the moved cropping window 817 of a second portion of the landscape video 822 in a corresponding second portion of the portrait video 826. Similarly, the cropping window module 812 includes the moved cropping window 817 of a third portion of the landscape video 822 in a corresponding third portion of the portrait video 826. Similarly, the cropping window module 812 includes the moved cropping window 817 of a fourth portion of the landscape video 822 in a corresponding fourth portion of the portrait video 826. The cropping window module 812 finds an initial object 830 and moves the cropping window 817 based on movement of the initial object 830, which the cropping window module tracks throughout the landscape video 822. In some examples, the initial object 830 is chosen based on a center of faces 1102. In some examples, the cropping windows module 812 choses the initial object 830 based on a selection by a user. In some examples, the cropping windows module 812 choses the initial object 830 based on object hierarchies 818. The object hierarchies 818 is a hierarchy 818 of objects 831. For example, one hierarchy 818 includes a face, upper body, whole body, arm, and so forth, to identify the object 831 as a person, which is at the top of this hierarchy 818. In some examples, the cropping windows module 812 determines the flight plan 616 where the initial object 830 is in the landscape video 822. In some examples, the cropping windows module 812 positions the cropping window 817 to lower or minimize an amount of the initial object 830 that is cutout or excluded from the portrait video 826.

The challenge is additionally addressed as follows. The video editing module 808 provides a user interface 806 that enables a user to convert a landscape video 822 to a portrait video 826 with little or no interaction from the user. Additionally, video editor module 808 using the user interface 806 enables the user to add other video effects 819 to the portrait videos 826. If a user would like to apply a video effect 819 and the video effect 819 cannot be applied to a portrait video 826, then the video editor module 808 provides the user with the option of reverting back to the landscape video 822 so that the video effect 819 may be applied. In some examples, the landscape videos 822 are captured by a drone 610 that uses a flight plan to capture the video 614.

Networked Computing Environment

Figure 1:
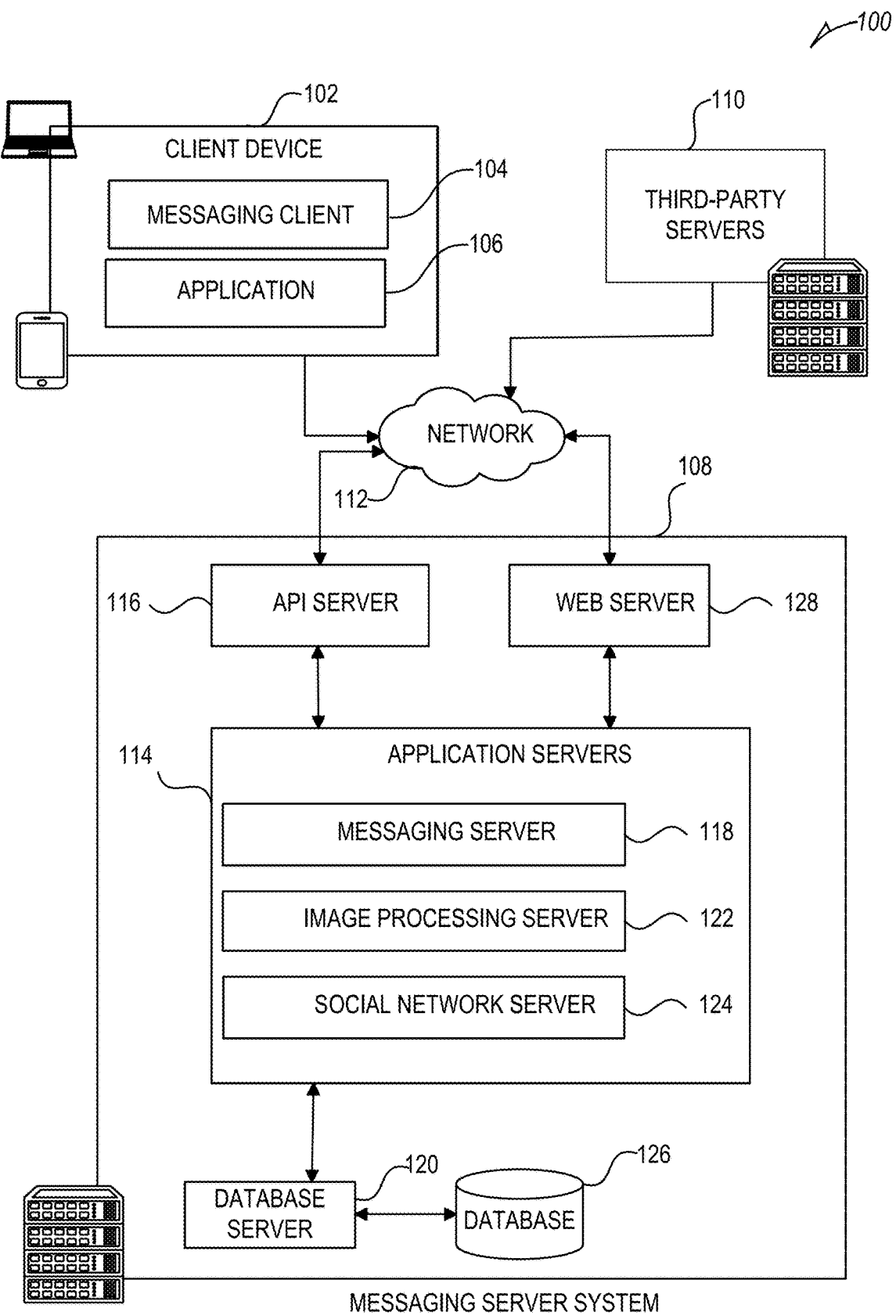
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
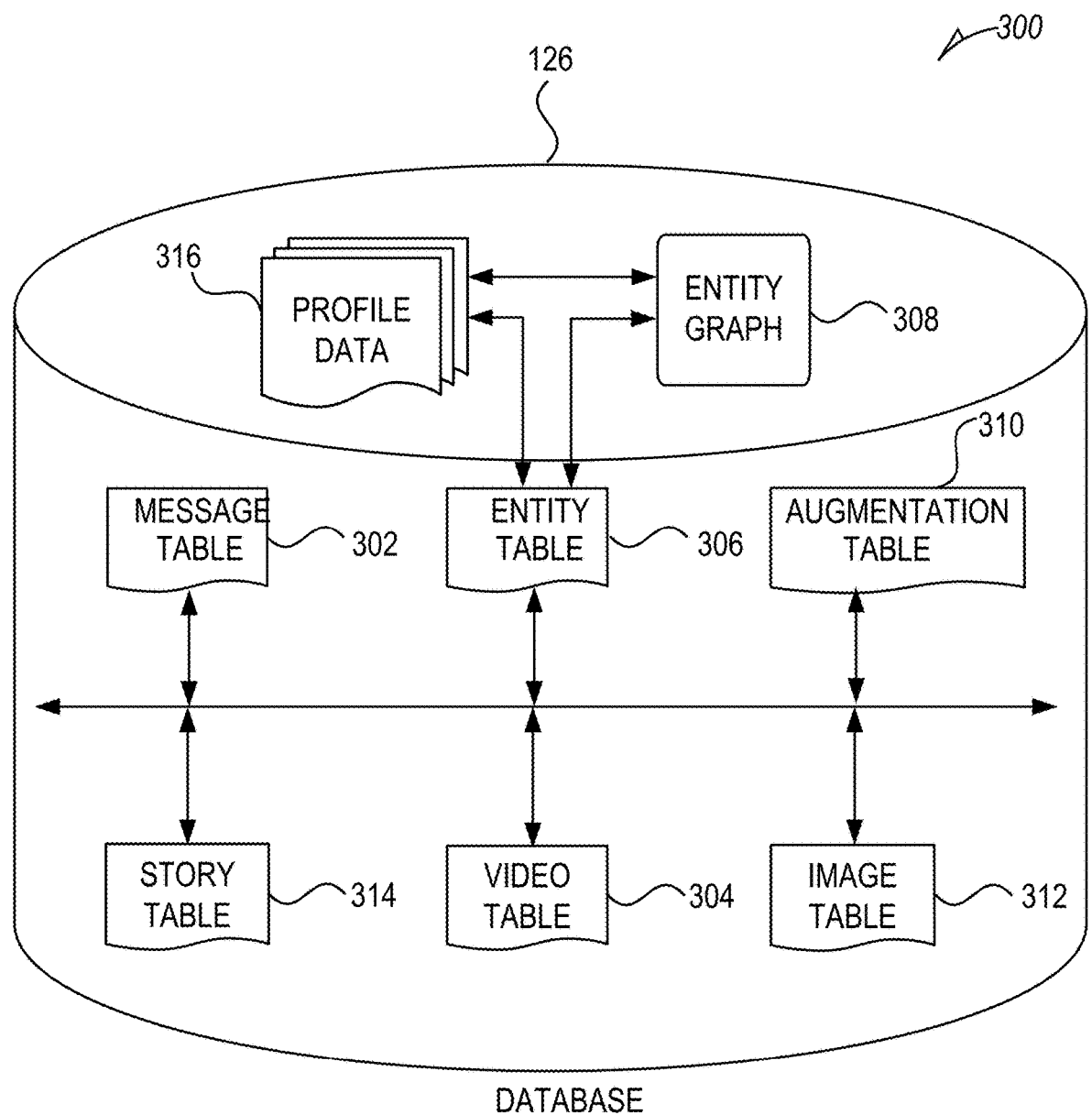
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
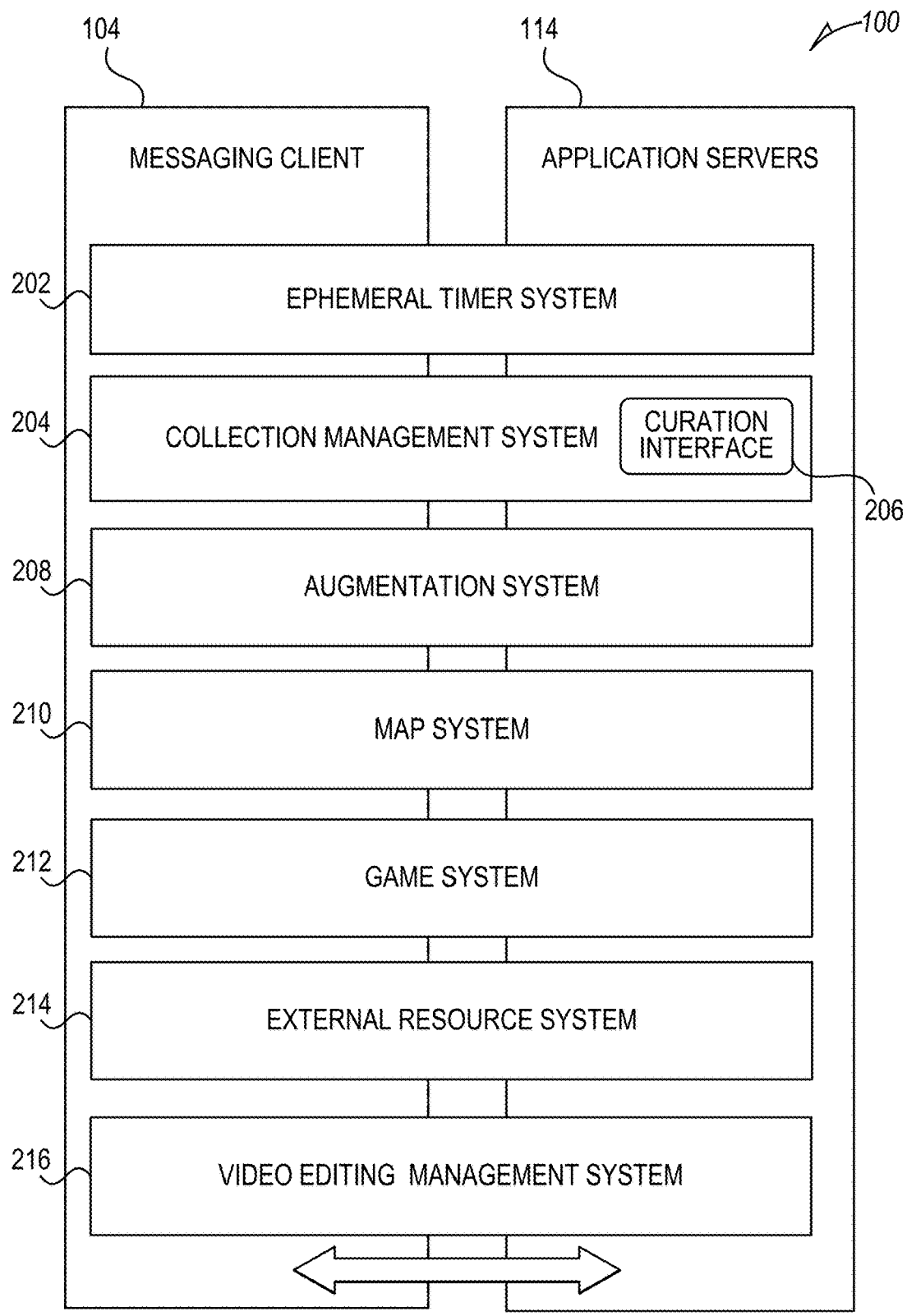
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a video editing management system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Figure 6:
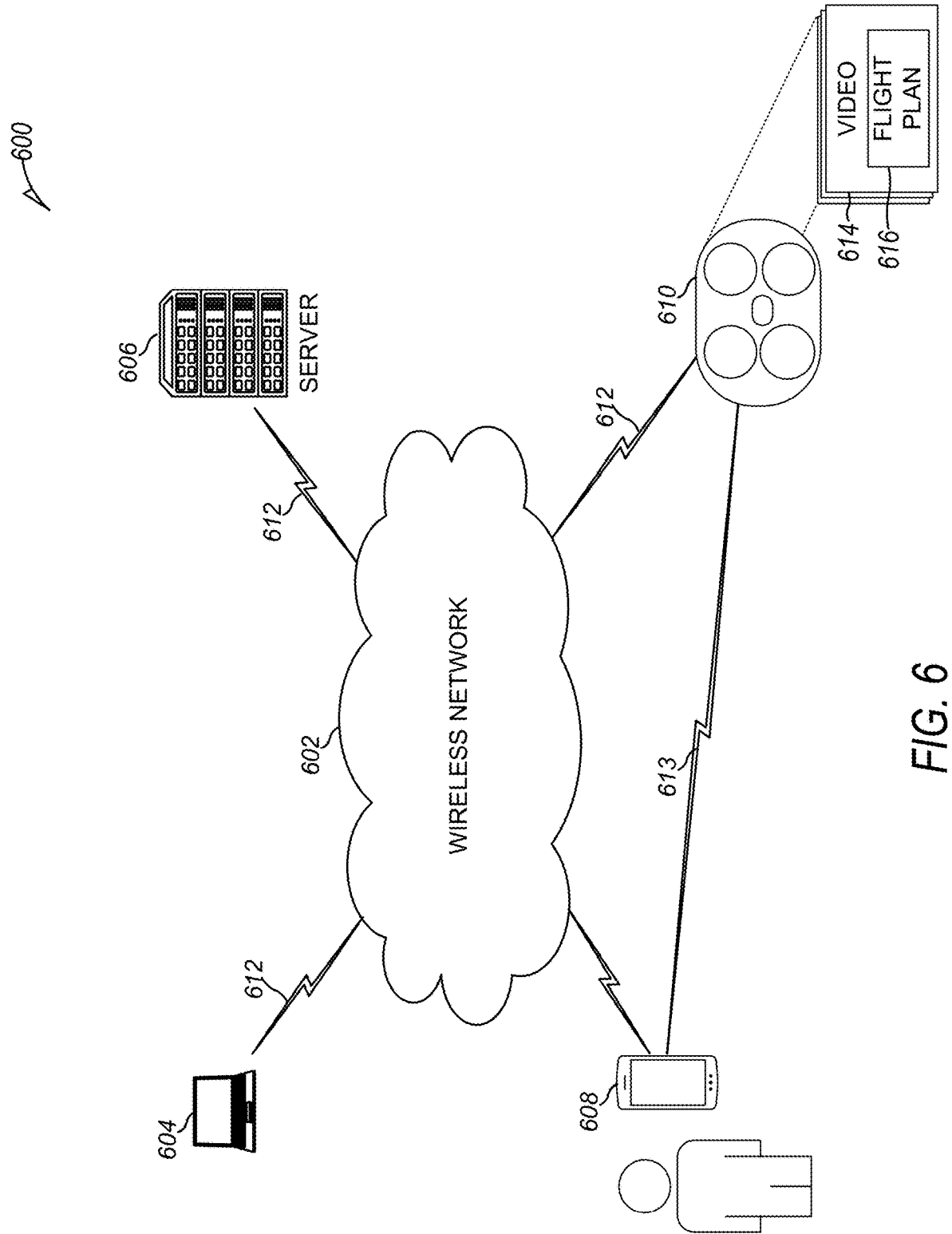
FIG. 6 is a schematic diagram illustrating a system for automatically cropping of landscape videos, in accordance with some examples.

The video editing management system 216 supports, referring to FIGS. 6 and 8, the off-site client device 604, the server 606, the smartphone 608, the drone 610, and the video editor module 808, in accordance with some examples. The video editing management system receives requests from the off-site client device 604, the server 606, the smartphone 608, the drone 610, and the video editor module 808 and responds to the requests. The requests include a request to process the video 614 to identify the initial object 830 or to send messages among the off-site client device 604, the server 606, the smartphone 608, the drone 610, and the video editor module 808. The off-site client device 604, the server 606, the smartphone 608, the drone 610, and the video editor module 808 may request other services from the video editing management system 216.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 316. Entities for which records are maintained within the entity table may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with the use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcasted by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus). As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
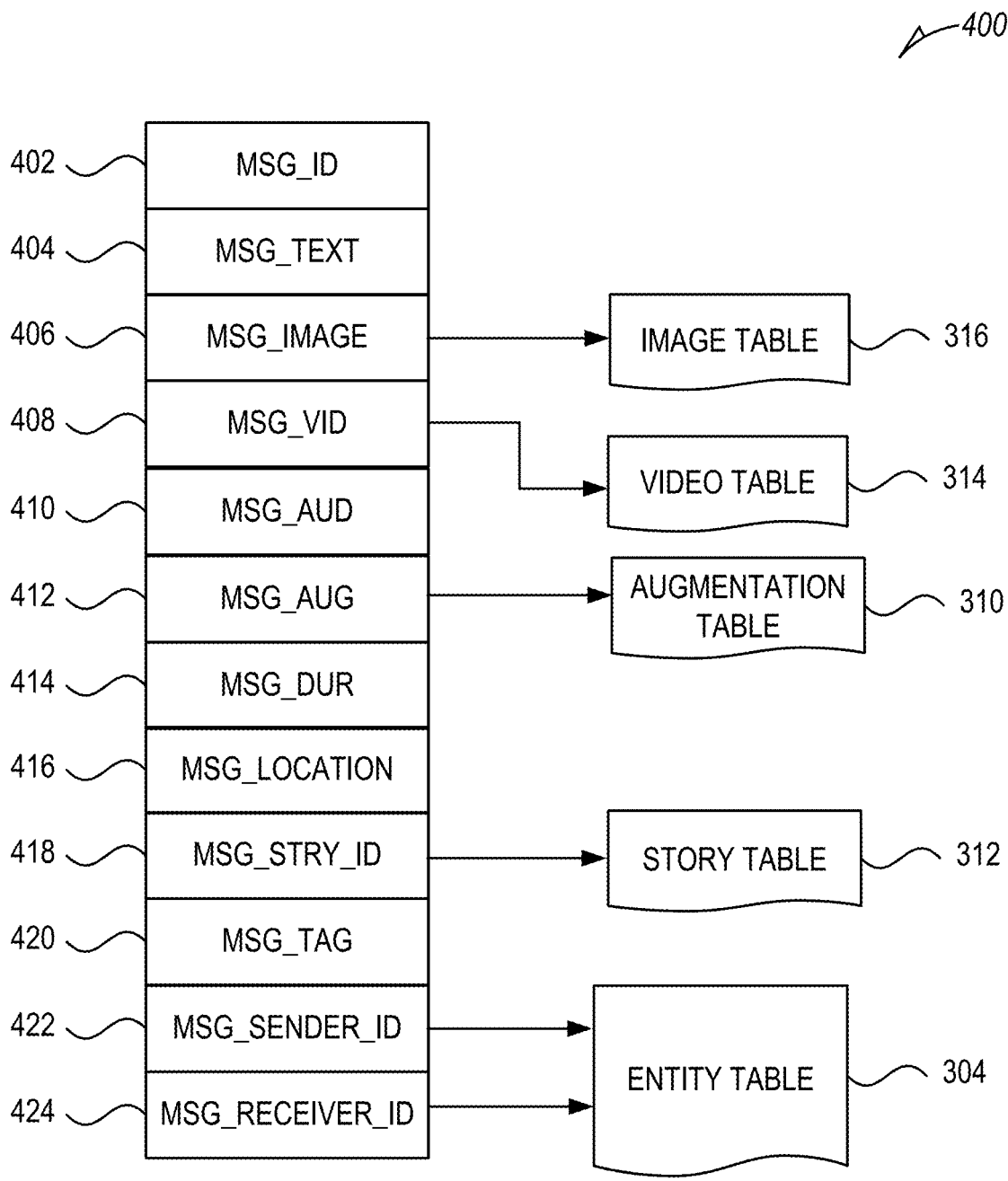
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier may point to data stored in a story table 314, and values stored within the message sender identifier 422 and the message receiver identifier 424 may point to user records stored within an entity table 306.

Time-Based Access Limitation Architecture

Figure 5:
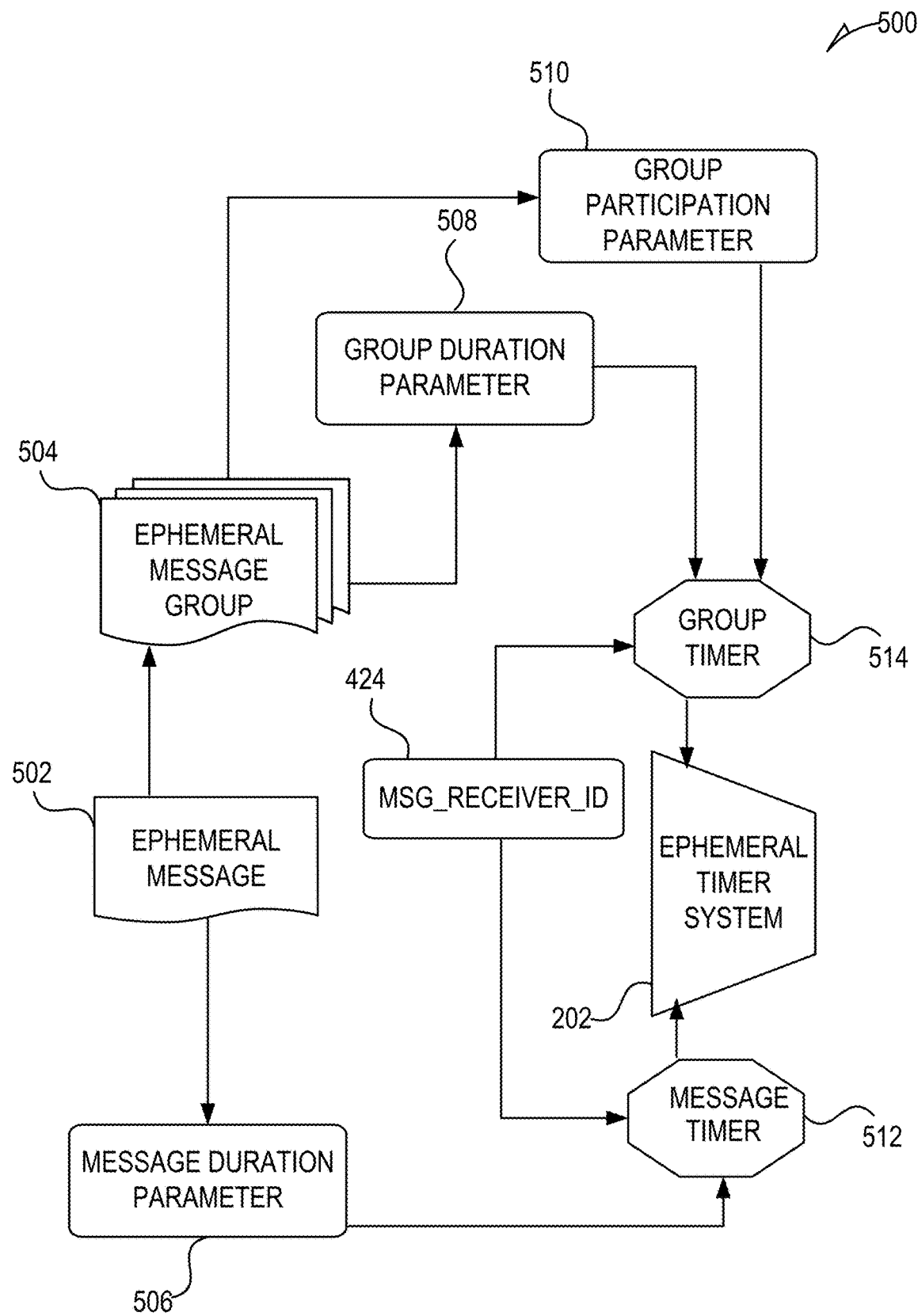
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Automatically Cropping of Landscape Videos

FIG. 6 is a schematic diagram illustrating a system 600 for automatically cropping of landscape videos, in accordance with some examples. In some examples the drone 610 is termed an autonomous drone, a semi-autonomous drone, a personal autonomous drone, or another term. The drone 610 communicates by sending communications 612, 613 to a host device such as off-site client device 604, server 606, mobile phone or smartphone 608, or another device. The wireless network 602 is a cellular telephone network such as an LTE network, an IEEE 802.11 network, a BlueTooth® network, a proprietary network, or another wireless network using another wireless communication protocol. In some examples, the drone communicates directly with the host device via communications 613 where communications 613 are sent using a communication protocol such as the communication protocols discussed for the wireless network 602.

In examples, the autonomous drone 610 sends communications 612, 613 that includes data such as videos 614 and/or commands or requests to another device such as the smartphone 608. In some instances, communication between the host device such as the smartphone 608 and the autonomous drone 610 may be via the wireless network 602. The wireless network 602 may include access to the internet and/or the autonomous drone 610 may access the internet via another connected device such as the smartphone 608.

In some examples, the server 606 provides a social networking service, to enable communication of content such as photos, videos, status updates, media content messages, and the like, directly to social-media sites such as Snapchat® from the autonomous drone 610, which may be in flight. In some examples, the server 606 is a messaging server system 108 and the video 614 captured by photography camera 706 of FIG. 7 of drone 610 is broadcasted or otherwise communicated via a wireless network 602, which may be in near-real time, to a host device such as smartphone 608, to servers 606, client devices 604, or another device. The autonomous drone 610 may be in contact with video editing management system 216 of FIG. 2 either directly or via another device.

One or more of the host devices such as the smartphone 608 may assist in processing of the data by receiving the data wirelessly, processing the video 614, and then sending back information wirelessly to the drone 610. For example, the smartphone 608 may receive an image from the drone 610 and determine that the image is a landmark such as a museum, restaurant, park, national monument, and so forth. The smartphone 608 sends back information that is used by the drone 610 to assist in a flight plan 616 associated with the landmark. The smartphone 608 contacts video editing management system 216 to perform functions for the drone 610. The drone 610 contacts the video editing management system 216 by sending commands to the video editing management system 216 such as store data for a user, request an identity of a user or a purchaser of the drone 610, and so forth.

In some examples, the host device such as the smartphone 608 includes an associated application that may be used by a user or device to control the drone 610 or send instructions to the drone 610 such as return to user, take a particular set flight, move to the left, move to right, move up or down, tilt, take a set of photographs, turn off, and so forth. The associated application may receive real-time or near real-time images of the videos 614 that the drone 610 is capturing.

In some examples, the host device acts as a router or passes through messages or packets to other devices connected to the wireless network 602 directly or indirectly. For example, the smartphone 608 receives an image via communications 613 from the drone 610. The smartphone 608 takes the image and sends it to server 606 for posting on a social media site, which may be in near-real time. The server 606 may be hosting the video editing management system 216. A host device such as the smartphone 608 controls a state of the autonomous drone 610 by sending instructions to the drone 610 via communications 613, 612, in accordance with some examples. One or more of the remote-control/host devices such as the smartphone 608 receives the video 614 by receiving the video 614 wirelessly or via a cable or another means, and process the video 614 by, for example, by providing a video editor module as described herein.

Example preprogrammed flight plans 616 include paths to follow such as to circle a user, or object, follow a predetermined route around or near a user or object where the path may be designed to capture a video or photograph, hover in front of the user, go to a destination and return, go to a destination and circle the destination for a video, follow a user, and so forth. The preprogrammed flight plan 616 may include a target distance from a person associated with the face and a target height of the drone 610 above a ground.

Figure 7:
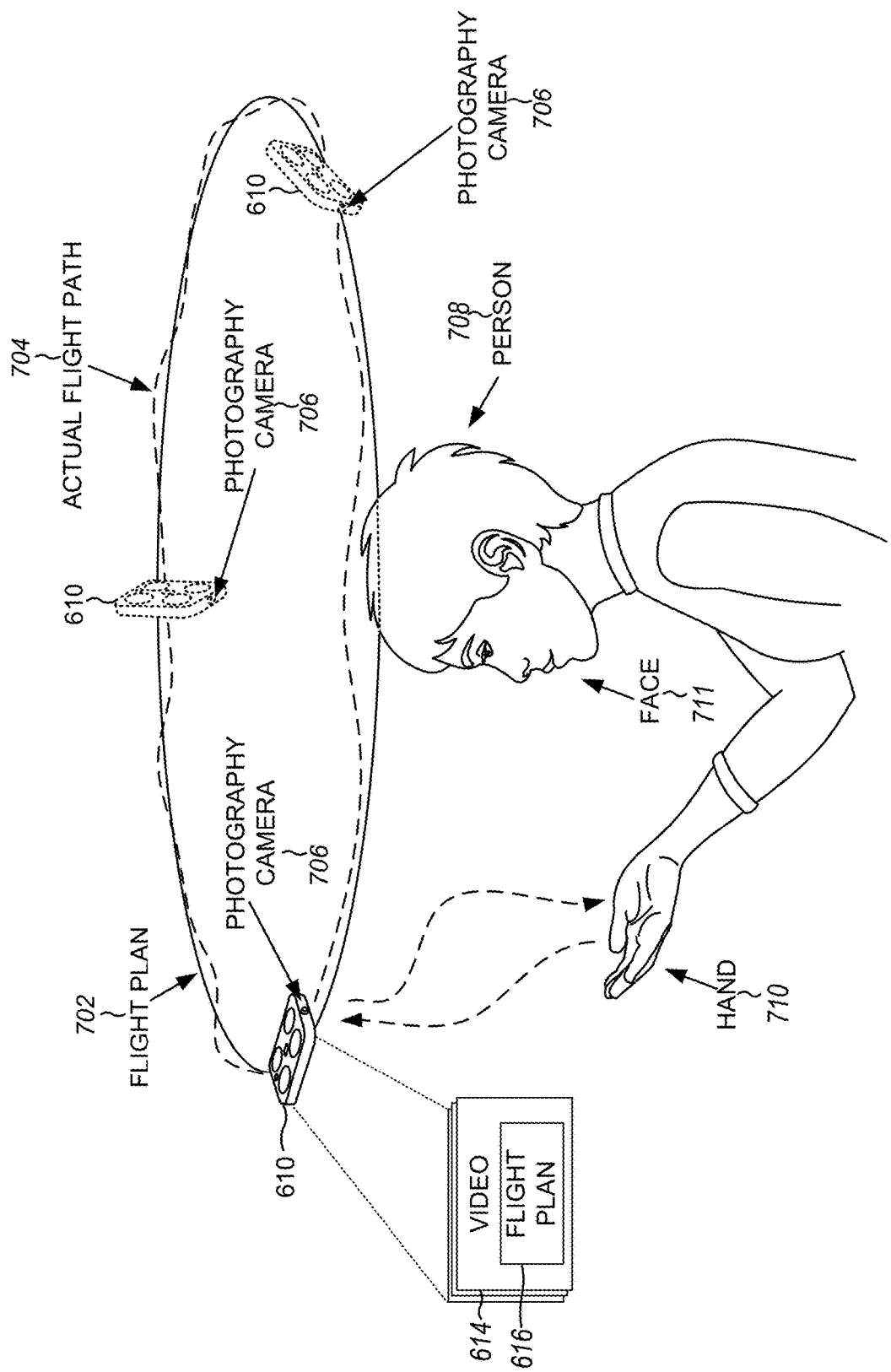
FIG. 7 illustrates a drone flying and capturing a video, in accordance with some examples.

FIG. 7 illustrates a drone 610 flying and capturing a video, in accordance with some examples. The drone 610 takes off from the hand 710 and flies in accordance with a flight plan on actual flight path 704 while taking a video 614 with the photography camera 706. The actual flight path 704 may be different than the flight plan 702 because the navigation system of the drone may not be able to maintain the drone 610 exactly on the flight plan 702 for various reasons including wind, control issues, the person 708 moving, and so forth. The video is associated with the flight plan 616, which, in this example, is flight plan 702.

Example flight plans 616 include paths to follow such as to circle or orbit one or more users, follow a predetermined route around or near a user or object where the path may be designed to capture a video or photograph, 360-degree fly around above the user, hover in front of the user, hover in front of the user and bounce, hover in front of a user and move forwards and backwards, go to a destination and return, go to a destination and circle the destination for a video, follow a user, and so forth. The person 708 is an example of a user. The term user is used but one skilled in the art will recognize the drone 610 may identify a group of people and perform the flight plan 702 in accordance with a position of a group of people or even an object. The preprogrammed flight plan 702 may include a target distance from a person 708 associated with the face 711 and a target height of the autonomous drone above a person 708 ground.

FIG. 8 illustrates a system 800 for automatically cropping of landscape videos, in accordance with some examples. The video editor module 808 processes a landscape video 822 to generate a portrait video 826. The landscape video 822 has an aspect ratio of 4 to 3 and the portrait video 826 has an aspect ratio of 9 to 16, in accordance with some examples. The landscape video 822 and the portrait video 826 may have different aspect ratios as one skilled in the art would recognize.

In some examples, the landscape video 822 is received from a drone 610 or another device where the video 614 was captured in accordance with the flight plan 616. The video is a landscape video 822. In some examples, the video 614 includes an actual path the drone 610 flew in capturing the video 614. For example, as discussed in conjunction with FIG. 7, the actual flight path 704 may be different than the flight plan 702. The drone 610 may record information about the actual flight path 704 such as a GPS location or a distance from the face 711 of the person 708. For example, the drone 610 may record a distance from the face 711 every ¹⁄₁₀ of second to 1 second, or another time period and include these distances with the flight plan 616. The landscape video 822 comprises frames 840 such as 10 to 60 frames 840 per second of the landscape video 822. The portrait video 826 comprises corresponding frames 842.

The screen 804 is an electronic device for displaying information on the smartphone 608. The user interface 806 is information presented by the video editor module 808 to provide user interface items 821. The video editor module 808 is used to process landscape videos 822 into portrait videos 826. The user interface items 821 include items displayed for the user to select in order to invoke a functionality of the video editor module 808. Examples include, referring to FIG. 9, the send 904, the revert to landscape 908 button, video effects 1014, and so forth. The object identifier module 810 identifies one or more objects to track or to be included in the cropping window 817. The object identifier module 810 identifies an initial object 830 to begin the conversion process from a landscape video 822 to a portrait video 826.

The cropping window module 812 determines where the cropping window 817 is placed within the landscape video 822 based on the initial object 830 and moves the cropping window 817 in response to movement of the initial object 830. The movement of the cropping window 817 is, in some examples, either a move left 814 or a move right 816. In some examples, the cropping window module 812 moves through the landscape video 822 one frame at a time and determines whether to move the cropping window 817 based on movement of the initial object 830. The cropping window module 812 calls on the object identifier module 810 to locate the initial object 830 in subsequent frames. In some examples, the portrait video 826 is enhanced by up sampling or using an image enhancement method.

The object identifier module 810 identifies the initial object 830 by searching for an object such as a person, face, or animal that is roughly in the middle of the landscape video 822. The object identifier module 810 determines a size of the initial object 830, for example, in pixels. In some examples, the object identifier module 810 determines there are many faces in the landscape video 822 and determines that the initial object 830 is a center of the faces as discussed in conjunction with FIG. 11. In some examples, the object identifier module determines the initial object 830 based on a user of the video editor module 808 touching or selecting an object displayed on the screen 804. For example, a user touches the face 1204 as discussed in conjunction with FIG. 12. The object identifier module 810 uses 2-dimensional body tracking and segmentation masks to identify the initial object 830, in accordance with some examples. In some examples, the object identifier 810 uses neural networks trained to identify a fixed number of objects such as people, animals, cars, and so forth.

Figure 13:
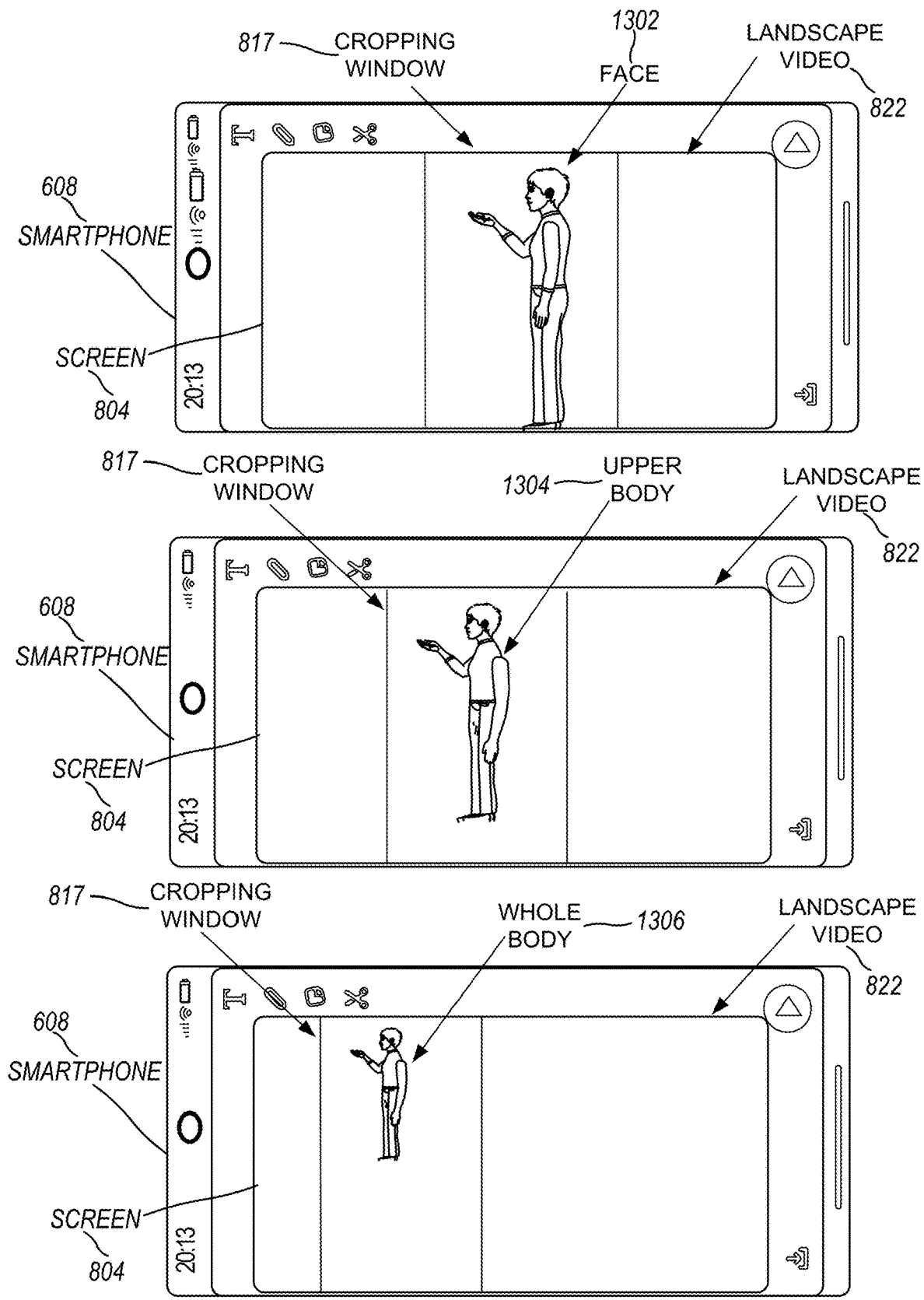
FIG. 13 illustrates the use of an object hierarchy, in accordance with some examples.

If the object identifier 810 is unable to determine the initial object 830 in subsequent frames of the landscape video 822, the object identifier 810 may use the object hierarchy 818. In some examples, the object identifier 810 uses an object hierarchy 818 of the object to locate the object within the frames of the landscape video 822. An example, object hierarchy 818 for people is a head, upper body, and then whole body. If the head is smaller than the upper body or body in the image, so it may be more difficult to identify. The upper body is larger than the head so it is easier to identify. Additionally, the body is larger than the head and the upper body so it may be easier to identify the entire body. The object identifier 810 uses the object hierarchy 818 to identify the initial object 830 and then the initial object 830 in subsequent frames of the landscape video 822. The object identifier 810 uses the object hierarchy 818 if it cannot find an object in a frame of the landscape video 822. FIG. 13 provides an example of an object hierarchy 818.

Figure 14:
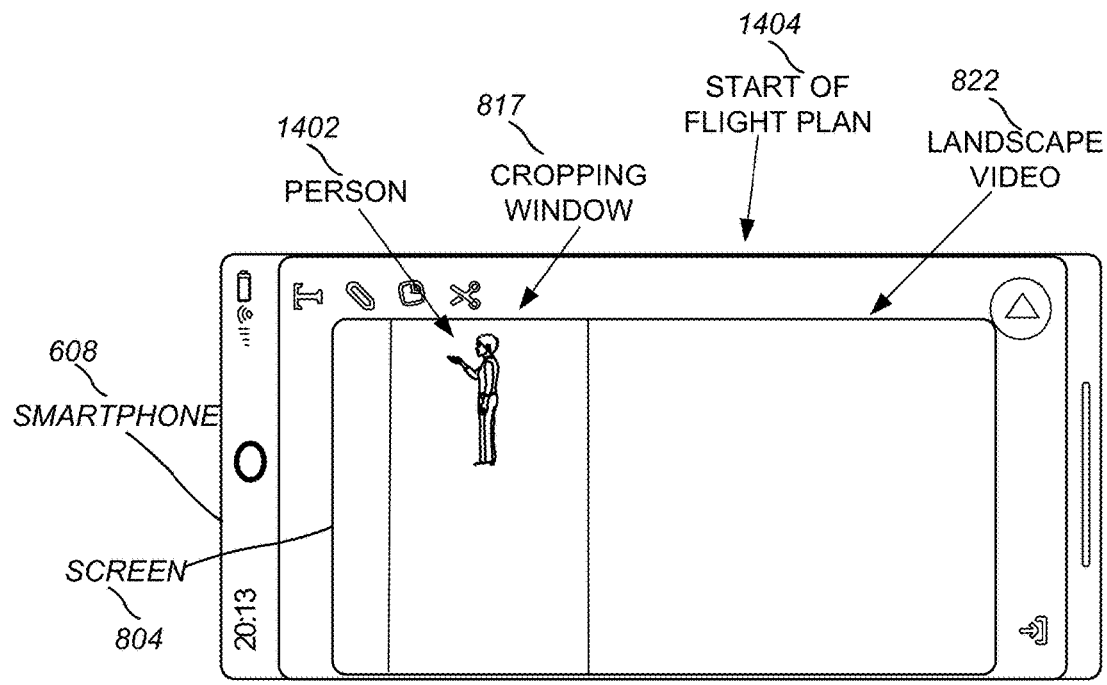
FIG. 14 illustrates using a flight plan to determine the initial object, in accordance with some examples.
Figure 14:
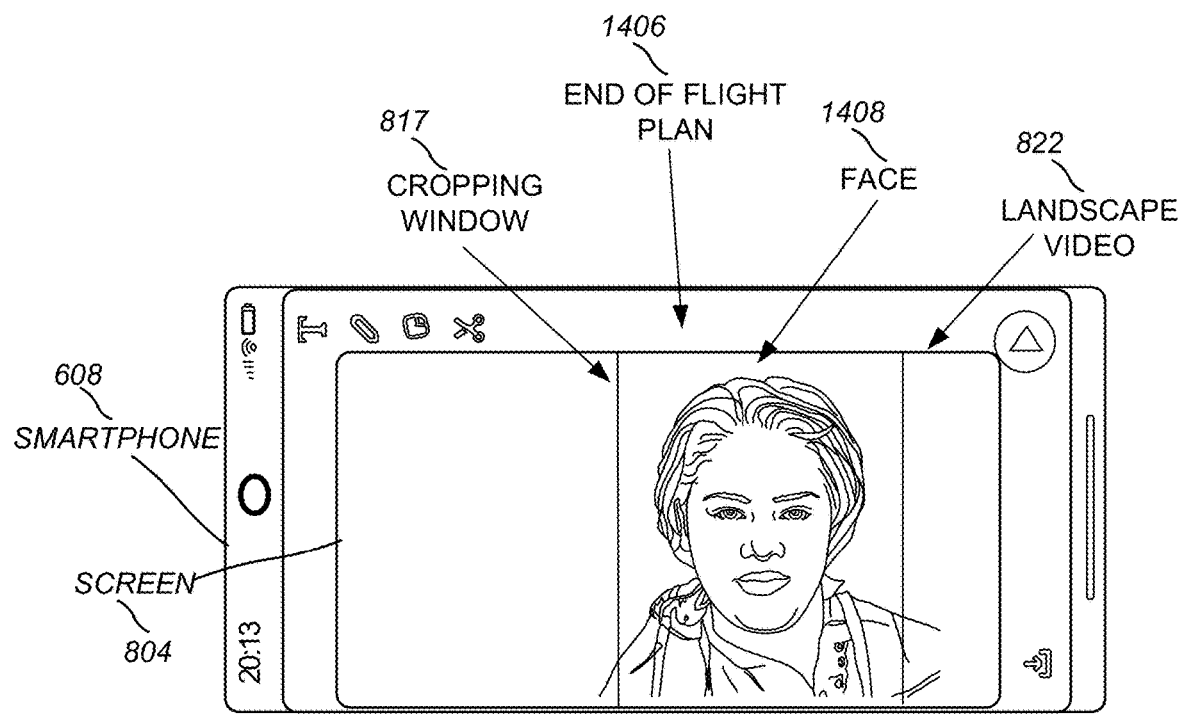

The object identifier module 810 uses the flight plan 616 to determine the initial object and to find the initial object 830 in frames of the landscape video 822. For example, if the flight plan 616 is to start far from a person and zoom into the person, the object identifier module 810 determines the characteristics of the landscape video 822 based on predetermined flight plans 820. The object identifier module 810 may then determine that in a far corner of the initial frame of the landscape video 822 there is supposed to be an object that is going to be zoomed in on. Or the object identifier module 810 may skip to the end and work backwards because the object identifier module 810 determines from the predetermined flight plan 820 that the object that should be included in the portrait video 826 will be zoomed into at the end of the landscape video 822. FIG. 14 provides an example of the object identifier module 810 using the flight plan 616 to determine the initial object 830.

The cropping window module 812 given the location and size of the initial object 830 in a frame 840 of the landscape video 822 determines where to place the cropping window 817. In some examples, the cropping window module 812 centers the initial object 830. In some examples, the cropping window module 812 adjusts the cropping window 817 to try and reduce portions of the initial object 830 from being cut off. Additionally, the cropping window module 812 may determine that some portion of a person has to be excluded from the cropping window 817. In response, the cropping window module 812 selects the portion of the person to exclude to lower the distortion to the person. For example, if a person is holding out their arms, the cropping window module 812 may determine to exclude a portion of an arm up to an elbow rather than exclude both hands. The cropping window module 812 uses the hierarchy to determine which parts of a person to exclude, in accordance with some examples. FIG. provides an example of the cropping window module 812 positioning the cropping window 817.

The privacy module 823 is configured to request consent before editing or posting the video 614 or landscape video 822 to a social media account. The privacy module 823 customizes the editing available to limit some editing for children that are under 15 years old or another age, in accordance with some examples. The privacy module 823 may be called by the video editor module 808 before video 614, landscape video 822, portrait video 826 are edited, stored, and/or transmitted, in accordance with some examples.

The video editor module 808 enables the user to select a user interface item 821 to save the portrait video 826 and to send the portrait video 826 as an ephemeral message via the messaging system 100. The video editor module 808 enables the user to edit and enhance the portrait video 826. The video editor module 808 enables the user to add augmentations to the portrait video 826. The video editor module 808 enables the user to relight the portrait video 826. The video editor module 808 enables other editing options for the user to edit the portrait video 826 or the landscape video 822.

In other examples, the server 606 performs some of the functionality described in conjunction with FIG. 8 and herein. In some examples, the video editor module 808 may operate on a different device such the off-site client device 604 (such as a laptop or desktop computer), server 606, or another device. In some examples, the video editor module 808 processes the video 614 to determine the flight plan 616, from a number of predetermined flight plans 820 used to capture the video 614.

Figure 9:
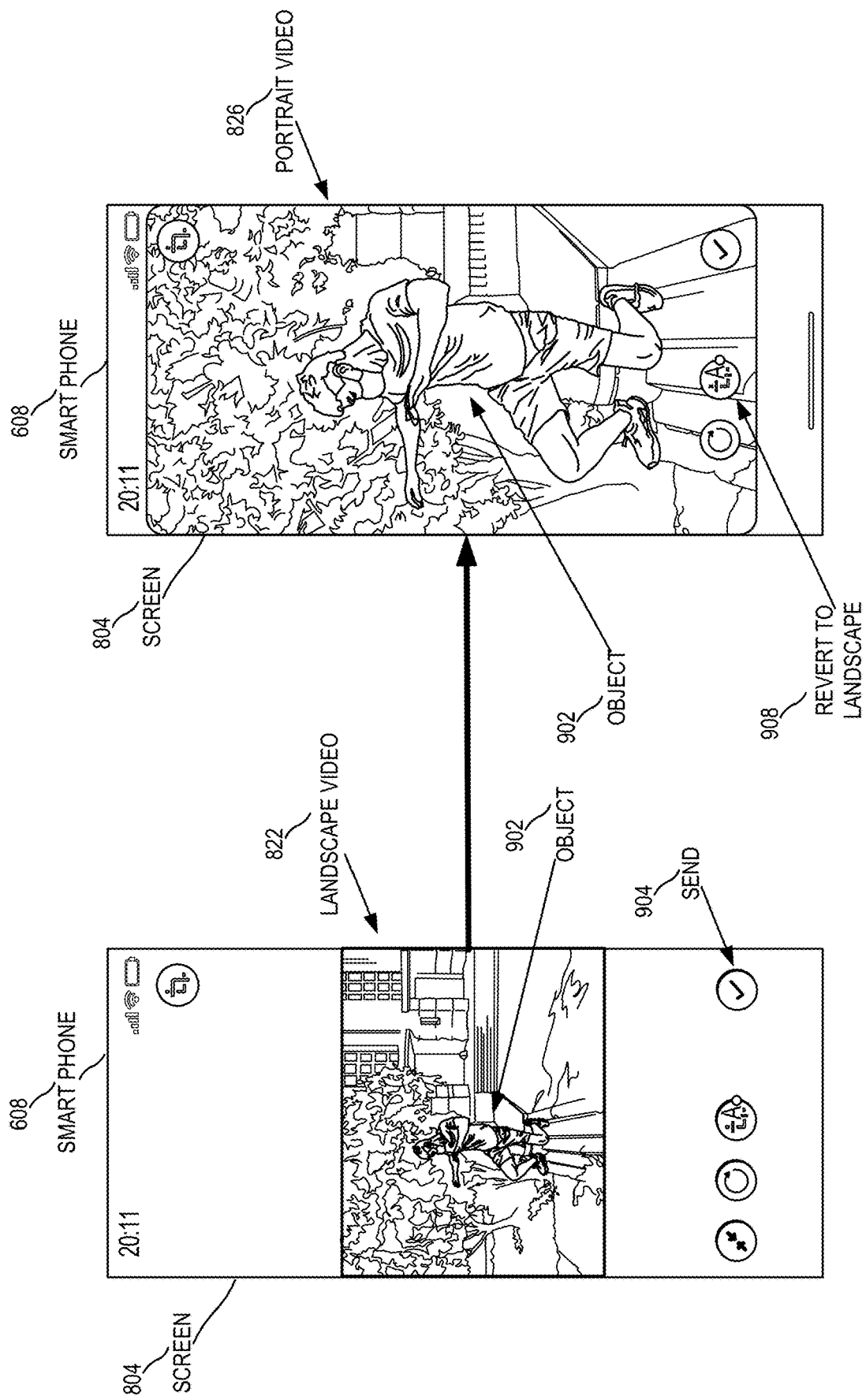
FIG. 9 illustrates a portrait video being generated from a landscape video, in accordance with some examples.

FIG. 9 illustrates a portrait video 826 being generated from a landscape video 822, in accordance with some examples. The landscape video 822 is converted to a portrait video 826 by the video editor module 808. The user can send 904 the landscape video 822 or the portrait video 826 as discussed herein. The object identifier module 810 identified the initial object as the object 902, which is a person. After the portrait video 826 is generated, the user has the option of reverting to landscape 908, in which case, the portrait video 826 is discarded and the landscape video 822 is returned as a current video.

Figure 10:
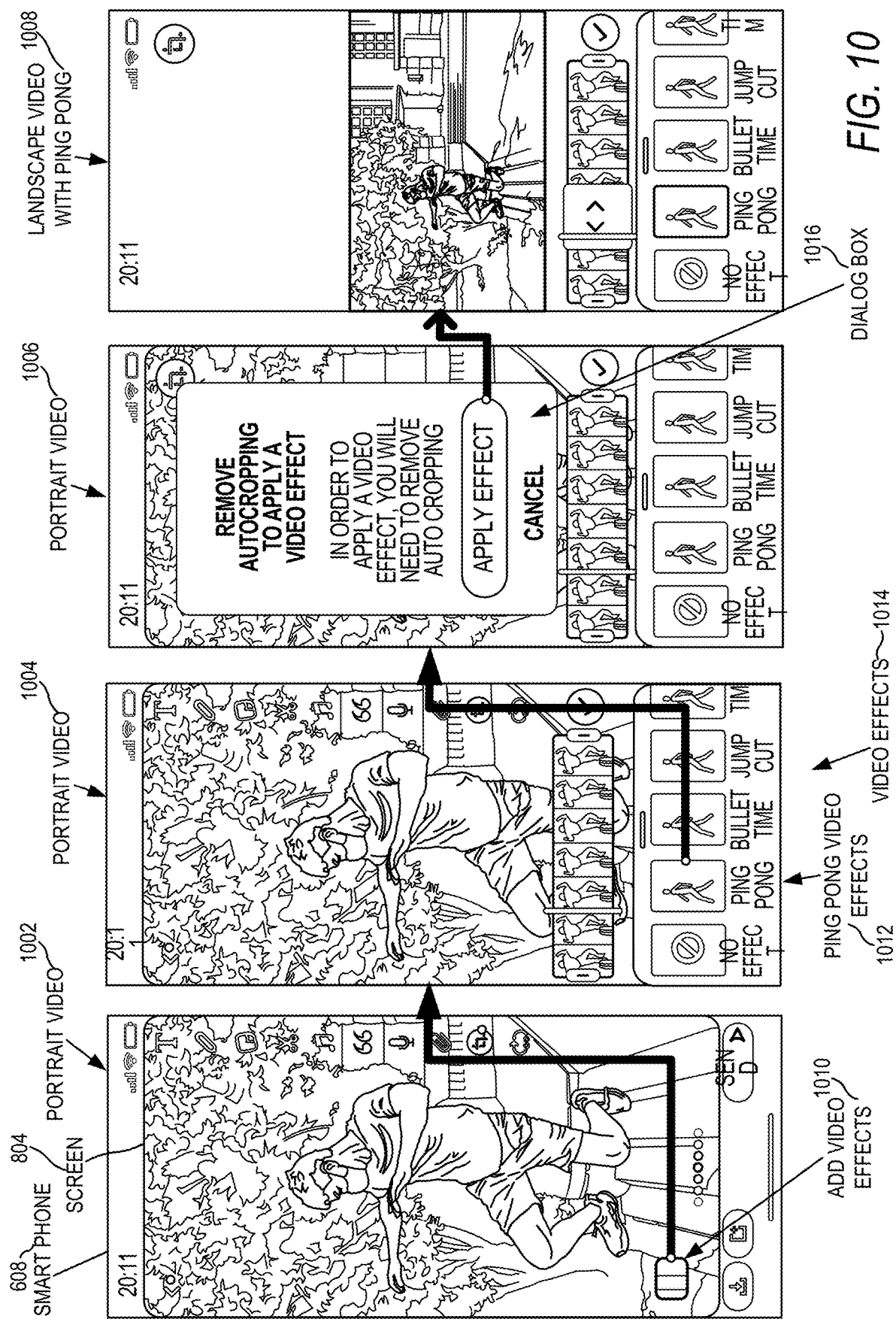
FIG. 10 illustrates automatic reversion to landscape video when video effects are incompatible, in accordance with some examples.

FIG. 10 illustrates automatic reversion to landscape video when video effects are incompatible, in accordance with some examples. The portrait video 1002 was generated from a landscape video. The user selects add video effects 1010 and the video editor module 808 responds by displaying video effects 1014, which are an example of video effects 819, as user interface items 821 the user may select with the portrait video 1004.

The user selects the "ping pong" video effects 1012, which is an effect that selects different segments of the video and puts them together in a new video. The video editor module 808 present a dialog box 1016 informing the user that the "ping pong" video effects cannot be applied to the portrait video 1006 but can be applied to the landscape video from which the portrait video 1006 was generated.

The user selects the option to revert back to the landscape video that was used to generate the portrait video 1006. The video editor module 808 reverts back to the landscape video 826 and applies the "ping pong" video effects 1012 to generate the landscape video with "ping pong" 1008. The video editor module 808 maintains metadata associated with the portrait video 1006 that is used to convert the portrait video 1006 back to the landscape video 826.

Figure 11:
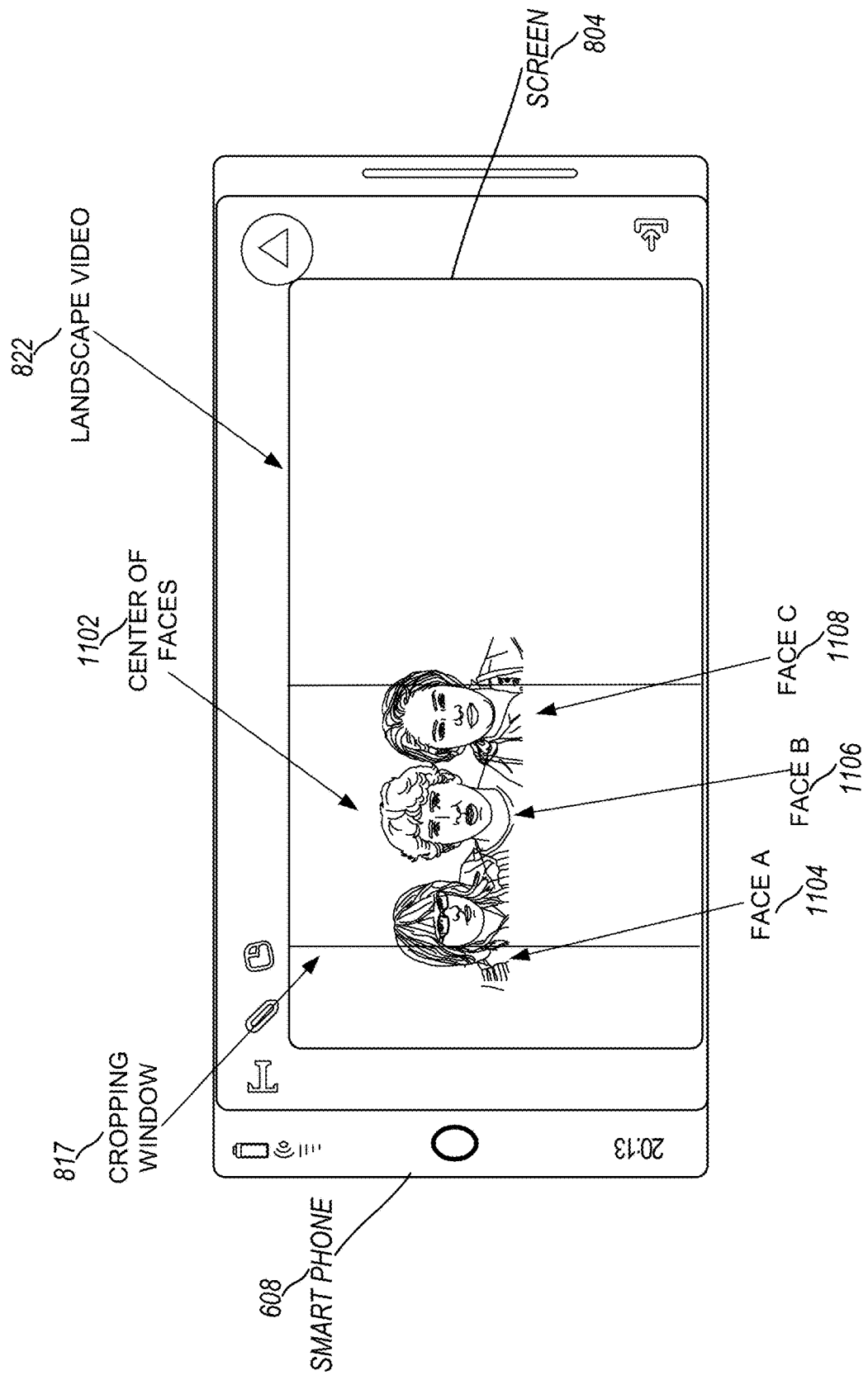
FIG. 11 illustrates selecting a center of faces, in accordance with some examples.

FIG. 11 illustrates selecting a center of faces, in accordance with some examples. The object identifier module 810 examines the beginning frame 840 or frames 840 of the landscape video 822 and determines there are multiple faces or a group of faces, which includes face A 1104, face B 1106, and face C 1108. The object identifier module 810 determines to select the initial object 830 as a center of faces 1102 or a center person. The cropping window module centers the cropping window 817 on the center of faces 1102. The process may continue frame 840 by frame 840 through the landscape video 822.

Figure 12:
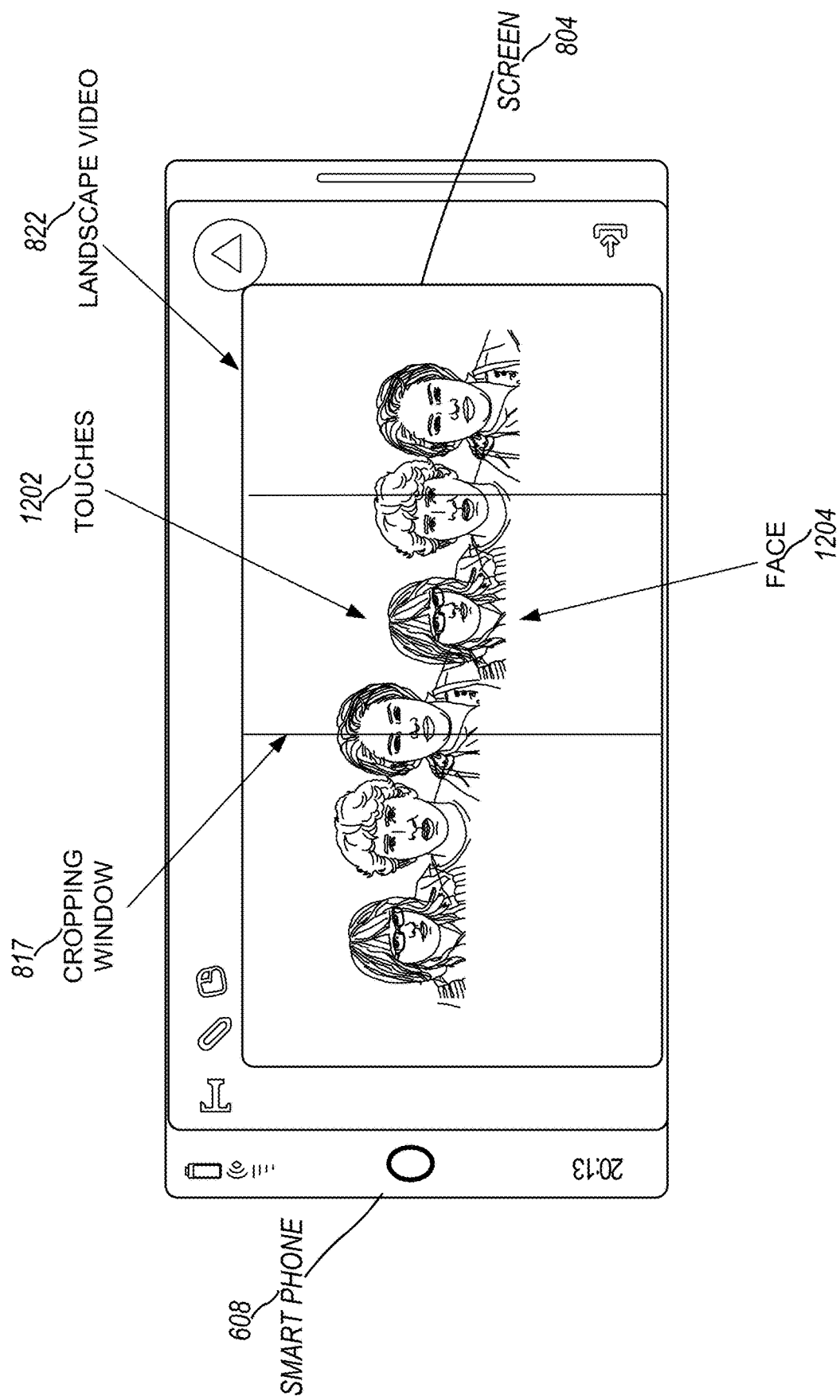
FIG. 12 illustrates selecting an initial object based on a selection from a user, in accordance with some examples.

FIG. 12 illustrates selecting an initial object based on a selection from a user, in accordance with some examples. A user touches 1202 the face 1204 in a first frame 840 or in a frame 840 of the landscape video 822. The object identifier module 810 identifies the face as the initial object 830 based on the placement of the touch. In some examples, the object identifier module 810 confirms the selection of the initial object 830 with the user. In some examples, the object identifier module 810 recognizes gestures such as circling a person or a voice command such as select the woman with glasses. The cropping window module 812 determines where to place the cropping window 817 based on the initial object 830.

FIG. 13 illustrates the use of an object hierarchy 818, in accordance with some examples. The object identifier module 810 determines the initial object 830 is a face of a person in the landscape video 822. A person has an object hierarchy 818 with a face, upper body, and body. The cropping window module 812 places the cropping window 817 based on the initial object 830 being the face 1302. A frame 840 or frames 840 of the landscape video are processed by the object identifier module 810. If object identifier module 810 cannot identify the initial object 830 using the face 1302, then the object identifier module 810 uses the upper body 1304 and identifies the initial object 830 by the upper body 1304. For example, the face may be too small to identify the face. The cropping window module 812 determines where to place the cropping window 817 based on the initial object 830, which is the upper body 1304. The object identifier module 810 or cropping window module 812 may use the object hierarchy 818 to determine the boundaries of the initial object 830.

The object identifier module 810 processes a frame 840 or frames 840 of the landscape video 822 cannot identify the initial object 830 using the upper body 1304. For example, the upper body 1304 has become too small. So, the object identifier module 810 uses the whole body 1306 and identifies the initial object 830 by the whole body 1306. The cropping window module 812 determines where to place the cropping window 817 based on the initial object 830, which is the whole body 1306.

FIG. 14 illustrates using a flight plan to determine the initial object, in accordance with some examples. The object identifier module 810 has difficulty determining the initial object at the start of flight plan 1404 because the person 1402 is so small and not in a center portion of the landscape video 822. The object identifier module 810 examines the flight plan used to capture the landscape video 822 and determines that the flight plan 616 is a zoom to person. So, the object identifier module 810 examines the frames 840 of the landscape video relative to the path taken by the drone 610 and determines the start of the zoom is the person 1402, so the person 1402 is made the initial object 830. In some examples, the object identifier module 810 determines to process the landscape video 822 backwards and finds the initial object 830 in one of the last frames of the landscape video 822 and processes the landscape video 822 backwards to the first frame of the landscape video 822. The object identifier module 810 determines the face 1408 is the initial object 830 based on the zoom flight plan 616. The cropping window module 812 determines where to place the cropping window 817 based on the face 1408 at the end of flight plan 1406 and the person 1402 at the start of flight plan 1404 using the hierarchy 818 of a person.

Figure 15:
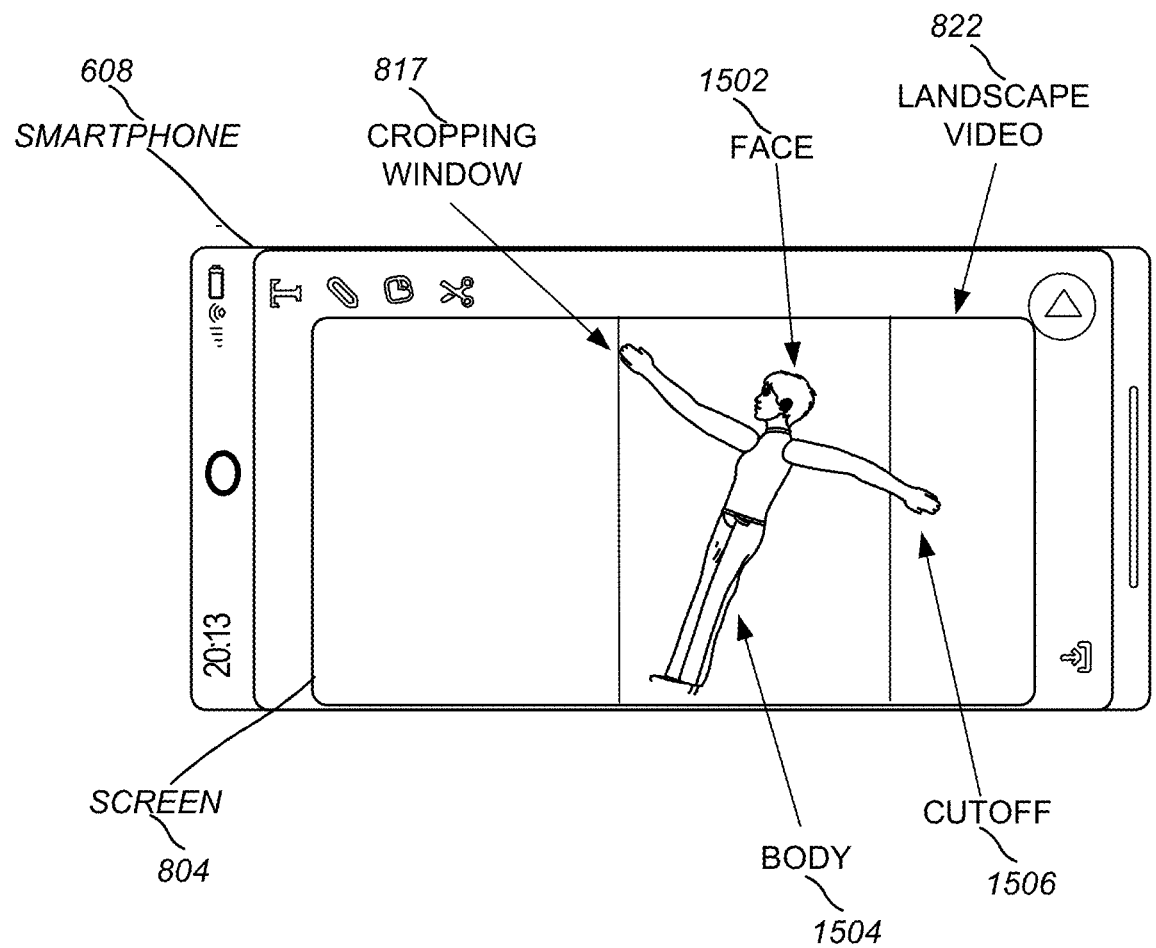
FIG. 15 illustrates the placement of the cropping window, in accordance with some examples.

FIG. 15 illustrates the placement of the cropping window, in accordance with some examples. The object identifier module 810 determines the initial object 830 is the face 1502 and reports the initial object 830 as having the boundaries of the body 1504 using the hierarchy of a person. The cropping window module 812 determines to place the cropping window so as to exclude only one of the hands of the body 1504 because centering the cropping window 817 on the body 1504 would exclude both hands. The hierarchy 818 of a person includes information or rules to aid the object identifier module 810 in choosing which part of a person to exclude from the copping window 817. The cutoff 1506 is a hand where the cropping window module 812 attempts to minimize or lessen the cutoff 1506 portions of the initial object 830 in selecting where to place the cropping window 817.

Figure 16:
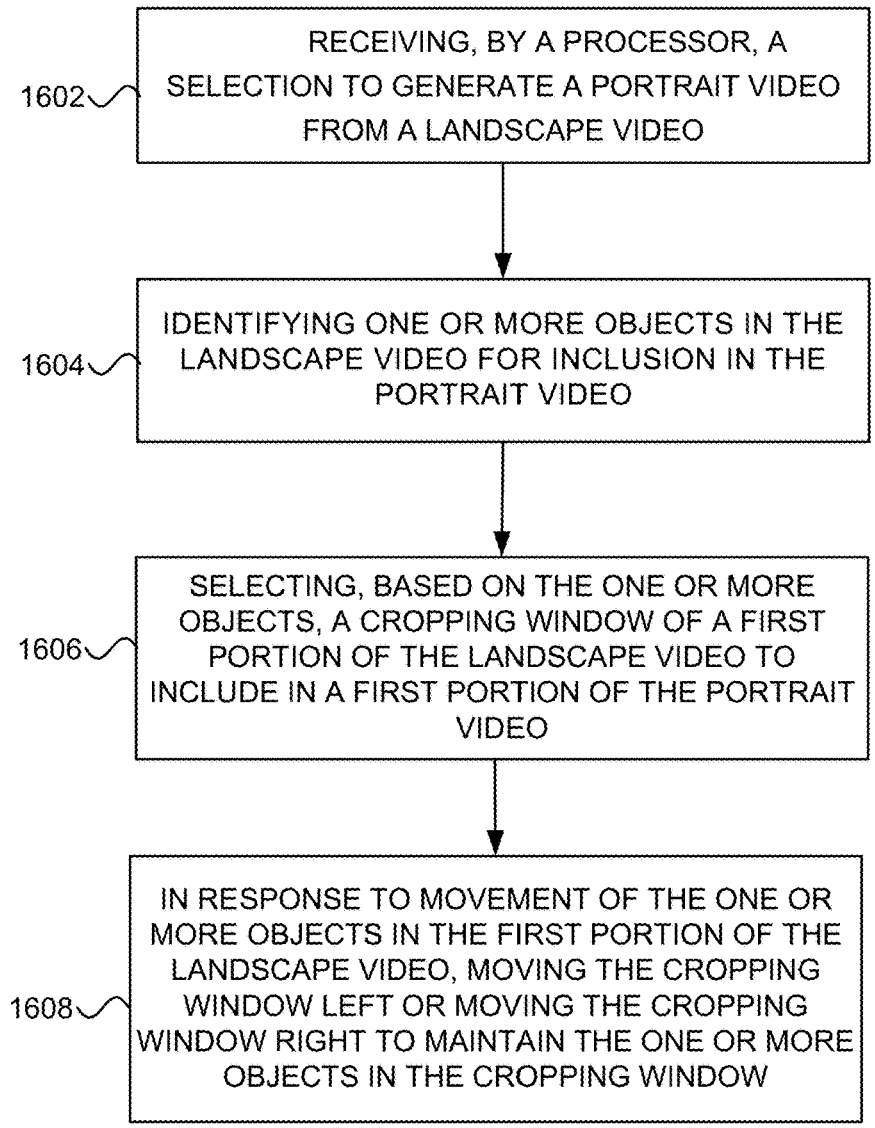
FIG. 16 illustrates a method for automatically cropping landscape videos, in accordance with some examples.

FIG. 16 illustrates a method 1600 for automatically cropping landscape videos, in accordance with some examples. The method 1600 begins at operation 1602 with receiving, by a processor, a selection to generate a portrait video from a landscape video. For example, in FIG. 9, the user selects an option to change the landscape video 822 into the portrait video 826.

The method 1600 continues at operation 1604 with identifying one or more objects in the landscape video for inclusion in the portrait video. For example, the object identifier module 810 selecting the initial object 830 is discussed in conjunction with FIGS. 9 and 11-15 and herein.

The method 1600 continues at operation 1606 with selecting, based on the one or more objects, a cropping window of a first portion of the landscape video to include in a first portion of the portrait video. For example, the object identifier module 810 selects a cropping window as discussed in conjunction with FIGS. 11-15 and herein. The cropping window 817 may be termed a moved cropped window or moved cropping window when it is moved by a move left 814 or a move right 816 by the cropping window module 812.

The method 1600 continues at operation 1608 with in response to movement of the one or more objects in the first portion of the landscape video, moving the cropping window left or moving the cropping window right to maintain the one or more objects in the cropping window. For example, FIG. 13 illustrates the cropping window module 81 moving the cropping window in accordance with the movement of the initial object 830.

The method 1600 may be performed by one or more devices or apparatuses of devices discussed herein either alone or in conjunction with one another. For example, the messaging system 100, smartphone 608, another device, or an apparatus of the device, may perform the method 1600 either alone or in conjunction with one another. One or more of the operations of method 1600 may be optional. Method 1600 may include one or more additional operations. One or more operations of method 1600 may be performed in a different order.

Machine Architecture

Figure 17:
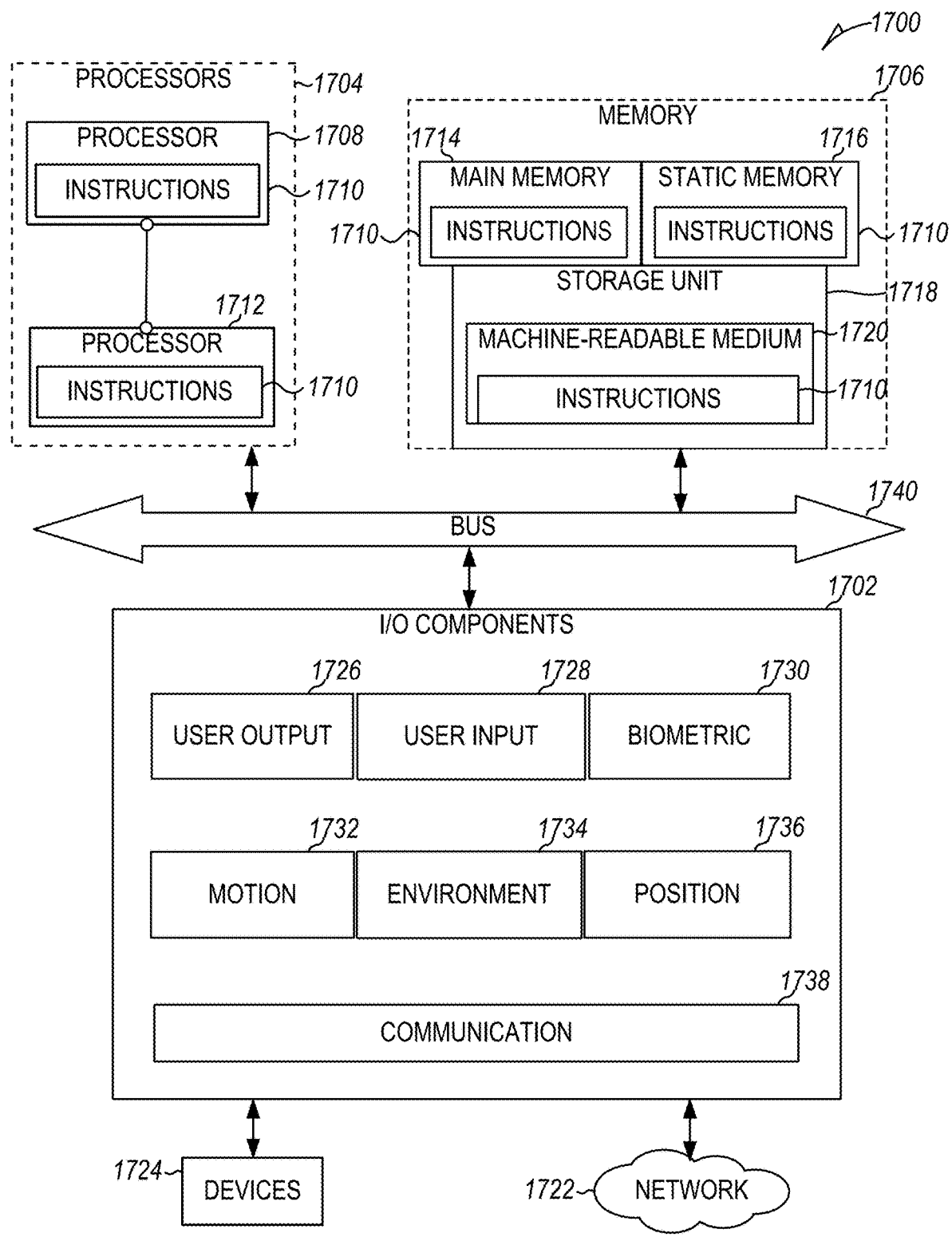
FIG. 17 is a diagrammatic representation of a machine in the form of a computer system within which a set of instructions may be executed for causing the machine to perform any one or more of the methodologies discussed herein, in accordance with some examples.

FIG. 17 is a diagrammatic representation of the machine 1700 within which instructions 1710 (e.g., software, a program, an application, an applet, an app, or other executable code) for causing the machine 1700 to perform any one or more of the methodologies discussed herein may be executed. For example, the instructions 1710 may cause the machine 1700 to execute any one or more of the methods described herein. The instructions 1710 transform the general, non-programmed machine 1700 into a particular machine 1700 programmed to carry out the described and illustrated functions in the manner described. The machine 1700 may operate as a standalone device or may be coupled (e.g., networked) to other machines. In a networked deployment, the machine 1700 may operate in the capacity of a server machine or a client machine in a server-client network environment, or as a peer machine in a peer-to-peer (or distributed) network environment. The machine 1700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1710, sequentially or otherwise, that specify actions to be taken by the machine 1700. Further, while only a single machine 1700 is illustrated, the term "machine" shall also be taken to include a collection of machines that individually or jointly execute the instructions 1710 to perform any one or more of the methodologies discussed herein. The machine 1700, for example, may comprise the client device 102 or any one of a number of server devices forming part of the messaging server system 108. In some examples, the machine 1700 may also comprise both client and server systems, with certain operations of a particular method or algorithm being performed on the server-side and with certain operations of the particular method or algorithm being performed on the client-side.

The machine 1700 may include processors 1704, memory 1706, and input/output I/O components 1702, which may be configured to communicate with each other via a bus 1740. In an example, the processors 1704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1708 and a processor 1712 that execute the instructions 1710. The term "processor" is intended to include multi-core processors that may comprise two or more independent processors (sometimes referred to as "cores") that may execute instructions contemporaneously. Although FIG. 17 shows multiple processors 1704, the machine 1700 may include a single processor with a single-core, a single processor with multiple cores (e.g., a multi-core processor), multiple processors with a single core, multiple processors with multiples cores, or any combination thereof.

The memory 1706 includes a main memory 1714, a static memory 1716, and a storage unit 1718, both accessible to the processors 1704 via the bus 1740. The main memory 1706, the static memory 1716, and storage unit 1718 store the instructions 1710 embodying any one or more of the methodologies or functions described herein. The instructions 1710 may also reside, completely or partially, within the main memory 1714, within the static memory 1716, within machine-readable medium 1720 within the storage unit 1718, within at least one of the processors 1704 (e.g., within the Processor's cache memory), or any suitable combination thereof, during execution thereof by the machine 1700.

The I/O components 1702 may include a wide variety of components to receive input, provide output, produce output, transmit information, exchange information, capture measurements, and so on. The specific I/O components 1702 that are included in a particular machine will depend on the type of machine. For example, portable machines such as mobile phones may include a touch input device or other such input mechanisms, while a headless server machine will likely not include such a touch input device. It will be appreciated that the I/O components 1702 may include many other components that are not shown in FIG. 17. In various examples, the I/O components 1702 may include user output components 1726 and user input components 1728. The user output components 1726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1702 may include biometric components 1730, motion components 1732, environmental components 1734, or position components 1736, among a wide array of other components. For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components include acceleration sensor components (e.g., accelerometer), gravitation sensor components, rotation sensor components (e.g., gyroscope).

The environmental components 1734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1702 further include communication components 1738 operable to couple the machine 1700 to a network 1722 or devices 1724 via respective coupling or connections. For example, the communication components 1738 may include a network interface Component or another suitable device to interface with the network 1722. In further examples, the communication components 1738 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1724 may be another machine or any of a wide variety of peripheral devices (e.g., a peripheral device coupled via a USB).

Moreover, the communication components 1738 may detect identifiers or include components operable to detect identifiers. For example, the communication components 1738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1738, such as location via Internet Protocol (IP) geolocation, location via Wi-Fi® signal triangulation, location via detecting an NFC beacon signal that may indicate a particular location, and so forth.

The various memories (e.g., main memory 1714, static memory 1716, and memory of the processors 1704) and storage unit 1718 may store one or more sets of instructions and data structures (e.g., software) embodying or used by any one or more of the methodologies or functions described herein. These instructions (e.g., the instructions 1710), when executed by processors 1704, cause various operations to implement the disclosed examples.

The instructions 1710 may be transmitted or received over the network 1722, using a transmission medium, via a network interface device (e.g., a network interface component included in the communication components 1738) and using any one of several well-known transfer protocols (e.g., hypertext transfer protocol (HTTP)). Similarly, the instructions 1710 may be transmitted or received using a transmission medium via a coupling (e.g., a peer-to-peer coupling) to the devices 1724.

Software Architecture

Figure 18:
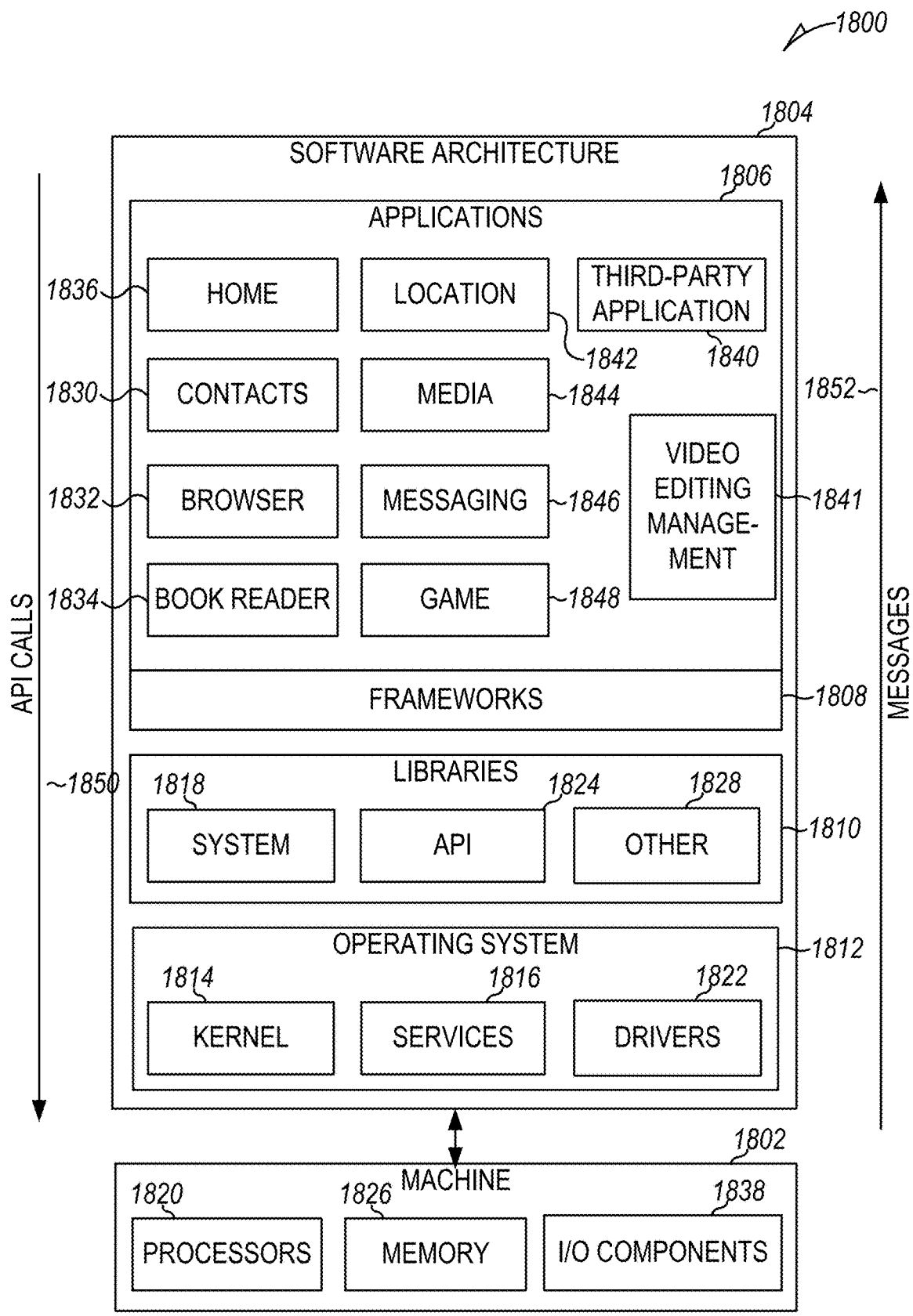
FIG. 18 is a block diagram showing a software architecture within which examples may be implemented.

FIG. 18 is a block diagram 1800 illustrating a software architecture 1804, which can be installed on any one or more of the devices described herein. The software architecture 1804 is supported by hardware such as a machine 1802 that includes processors 1820, memory 1826, and I/O components 1838. In this example, the software architecture 1804 can be conceptualized as a stack of layers, where each layer provides a particular functionality. The software architecture 1804 includes layers such as an operating system 1812, libraries 1810, frameworks 1808, and applications 1806. Operationally, the applications 1806 invoke API calls 1850 through the software stack and receive messages 1852 in response to the API calls 1850.

The operating system 1812 manages hardware resources and provides common services. The operating system 1812 includes, for example, a kernel 1814, services 1816, and drivers 1822. The kernel 1814 acts as an abstraction layer between the hardware and the other software layers. For example, the kernel 1814 provides memory management, processor management (e.g., scheduling), component management, networking, and security settings, among other functionalities. The services 1816 can provide other common services for the other software layers. The drivers 1822 are responsible for controlling or interfacing with the underlying hardware. For instance, the drivers 1822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1810 provide a common low-level infrastructure used by the applications 1806. The libraries 1810 can include system libraries 1818 (e.g., C standard library) that provide functions such as memory allocation functions, string manipulation functions, mathematic functions, and the like. In addition, the libraries 1810 can include API libraries such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1810 can also include a wide variety of other libraries 1828 to provide many other APIs to the applications 1806.

The frameworks 1808 provide a common high-level infrastructure that is used by the applications 1806. For example, the frameworks 1808 provide various graphical user interface (GUI) functions, high-level resource management, and high-level location services. The frameworks 1808 can provide a broad spectrum of other APIs that can be used by the applications 1806, some of which may be specific to a particular operating system or platform.

In an example, the applications 1806 may include a home application 1836, a contacts application 1830, a browser application 1832, a book reader application 1834, a location application 1842, a media application 1844, a messaging application 1846, a game application 1848, and a broad assortment of other applications such as a third-party application 1840. The video editing management 1841 system manages the video editing functions as disclosed in conjunction with the video editing management system 216 and herein. The applications 1806 are programs that execute functions defined in the programs. Various programming languages can be employed to create one or more of the applications 1806, structured in a variety of manners, such as object-oriented programming languages (e.g., Objective-C, Java, or C++) or procedural programming languages (e.g., C or assembly language). In a specific example, the third-party application 1840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1840 can invoke the API calls 1850 provided by the operating system 1812 to facilitate functionality described herein.

Processing Components

Figure 19:
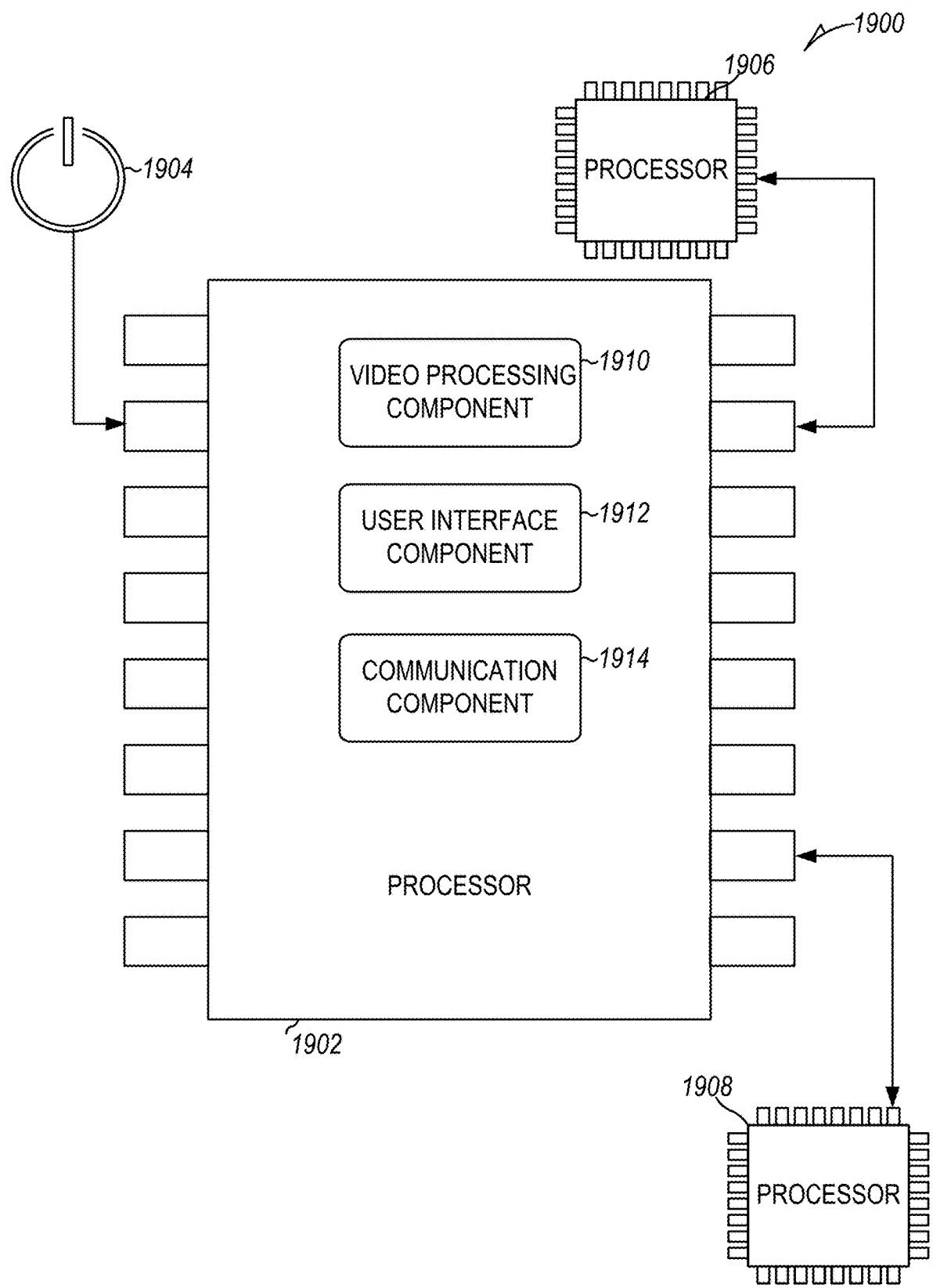
FIG. 19 is a diagrammatic representation of a processing environment, in accordance with some examples.

Turning now to FIG. 19 there is shown a diagrammatic representation of a processing environment 1900, which includes a processor 1902, a processor 1906, and a processor 1908 (e.g., a GPU, CPU or combination thereof).

The processor 1902 is shown to be coupled to a power source 1904, and to include (either permanently configured or temporarily instantiated) modules, namely a video processing component 1910, a user interface component 1912, and a communication component 1914. The video processing component 1910 controls processing of the landscape videos 822 to generate portrait videos 826. The user interface component 1912 manages the interaction with a user such as presenting user interface items 821 and responding to the selection of user interface items 821 by a user. The communication component 1914 manages the communications such as communications 612, 613 from a smartphone 608 to other devices.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
    at least one processor; and
    a memory storing instructions that, when executed by the at least one processor, configure the at least one processor to perform operations comprising:
    receiving a selection to generate a portrait video from a landscape video;
    identifying a person in the landscape video for inclusion in the portrait video;
    selecting, based on the person, a cropping window of a first portion of the landscape video to include in a first portion of the portrait video;

determining whether a face of the person can be identified;
in response to not being able to identify the face of the person,
identifying an upper body of the person associated with the person; and
in response to movement of the upper body of the person in the first portion of the landscape video, moving the cropping window left or moving the cropping window right to maintain the upper body of the person in the cropping window.

2. The system of claim 1 wherein the operations further comprise:
including the moved cropping window of a second portion of the landscape video in a corresponding second portion of the portrait video.

3. The system of claim 1 wherein the operations further comprise:
in response to being unable to identify the upper body of the person,
identifying a whole body of the person associated with the upper body of the person;
in response to movement of the whole body of the person in the third first portion of the landscape video, moving the cropping window left or moving the cropping window right to maintain the whole body in the cropping window; and
including the moved cropping window of a second portion of the landscape video in a corresponding second portion of the portrait video.

4. The system of claim 1 wherein the identifying further comprises:
identifying a plurality of people in the landscape video; and
selecting an upper body of a center person of the plurality of people as the person.

5. The system of claim 1 wherein the identifying further comprises:
identifying a body of a person in a center portion of the landscape video; and
selecting the body of the person as the upper body of the person.

6. The system of claim 1 wherein the identifying further comprises:
identifying a body of the person, and wherein the selecting further comprises:
selecting, based on centering the body of the person, the cropping window.

7. The system of claim 1 wherein the identifying further comprises:
identifying a center of a group of faces, the group of faces comprising a face of the person, and wherein the selecting further comprises:
selecting, based on centering the group of faces, the cropping window of the first portion of the landscape video to include in the first portion of the portrait video.

8. The system of claim 1 wherein the first portion is one or more frames of the landscape video.

9. The system of claim 1 wherein the identifying is performed with a neural network trained to identify people or wherein the identifying is based on 2-dimensional body tracking and segmentation masks.

10. The system of claim 1 wherein the identifying further comprises:
identifying a body of an animal or object, and wherein the selecting further comprises:
selecting, based on centering the body of the animal or object and the person, the cropping window of the first portion of the landscape video to include in the first portion of the portrait video.

11. The system of claim 1 wherein the portrait video has an aspect ratio of 9 to 16 and the landscape video has an aspect ratio of 4 to 3.

12. The system of claim 1 wherein the identifying further comprises:
identifying the person in the landscape video based on a selection received from a user of an area for identifying the person within the landscape video.

13. The system of claim 1 wherein the identifying further comprises:
identifying the person in the landscape video based on a flight plan associated with capturing the landscape video, wherein the flight plan indicates a location of the person.

14. The system of claim 1 wherein the operations further comprise:
after the selecting, processing the first portion of the portrait video to include the cropping window of the first portion of the landscape video.

15. The system of claim 1, wherein the operations further comprise:
in response to being able to identify the face of the person, and to movement of the face in the first portion of the landscape video, moving the cropping window left or moving the cropping window right to maintain the face of the person in the cropping window.

16. A method comprising:
receiving, by at least one processor, a selection to generate a portrait video from a landscape video;
identifying a person in the landscape video for inclusion in the portrait video;
selecting, based on the person, a cropping window of a first portion of the landscape video to include in a first portion of the portrait video;
determining whether a face of the person can be identified;
in response to not being able to identify the face of the person,
identifying an upper body of the person associated with the person; and
in response to movement of the upper body of the person in the first portion of the landscape video, moving the cropping window left or moving the cropping window right to maintain the upper body of the person in the cropping window.

17. The method of claim 16 further comprising:
including the moved cropping window of a second portion of the landscape video in a corresponding second portion of the portrait video.

18. A non-transitory computer-readable storage medium, the non-transitory computer-readable storage medium including instructions that, when executed by at least one processor of an apparatus of a system, cause the at least one processor to perform operations comprising:
receiving a selection to generate a portrait video from a landscape video;
identifying a person in the landscape video for inclusion in the portrait video;
selecting, based on the person, a cropping window of a first portion of the landscape video to include in a first portion of the portrait video;
determining whether a face of the person can be identified;

in response to not being able to identify the face of the person, identifying an upper body of the person associated with the person; and in response to movement of the upper body of the person in the first portion of the landscape video, moving the cropping window left or moving the cropping window right to maintain the upper body of the person in the cropping window.

19. The non-transitory computer-readable storage medium of claim 18, wherein the operations further comprise:

including the moved cropping window of a second portion of the landscape video in a corresponding second portion of the portrait video.

20. The non-transitory computer-readable storage medium of claim 18, wherein the identifying is performed with a neural network trained to identify people or wherein the identifying is based on 2-dimensional body tracking and segmentation masks.

* * * * *